United States Patent [19]
Ikebuchi et al.

[11] Patent Number: 5,454,763
[45] Date of Patent: Oct. 3, 1995

[54] SHIFT CONTROL APPARATUS FOR AUTOMATIC TRANSMISSION AND CONTROL METHOD THEREFOR

[75] Inventors: Tetsuo Ikebuchi, Kyoto; Kenjiro Fujita, Shiga; Katsutoshi Usuki, Kyoto, all of Japan

[73] Assignee: Mitsubishi Jidosha Kogyo Kabushiki Kaisha, Tokyo, Japan

[21] Appl. No.: 3,400

[22] Filed: Jan. 12, 1993

[30] Foreign Application Priority Data

Jan. 17, 1992 [JP] Japan .................................. 4-006374

[51] Int. Cl.⁶ .................................................. F16H 61/08
[52] U.S. Cl. ............................ 475/128; 475/123; 477/120
[58] Field of Search ..................................... 475/120, 123, 475/122, 127, 128; 74/866; 364/424.1

[56] References Cited

U.S. PATENT DOCUMENTS

| | | | |
|---|---|---|---|
| 4,685,356 | 8/1987 | Iwatsuki | 475/120 X |
| 4,708,032 | 11/1987 | Harada et al. | 475/123 X |
| 4,718,310 | 1/1988 | Shindo et al. | 475/120 X |
| 4,779,492 | 10/1988 | Yasue et al. | 475/127 X |
| 4,789,937 | 12/1988 | Yasue et al. | 364/424.1 |
| 4,942,530 | 7/1990 | Boda et al. | 364/424.1 |
| 4,945,482 | 7/1990 | Nishikawa et al. | 475/128 X |
| 5,014,573 | 5/1991 | Hunter et al. | 477/61 |
| 5,047,935 | 9/1991 | Kashihara | 364/424.1 |
| 5,131,298 | 7/1992 | Marusue | 477/144 |
| 5,140,871 | 8/1992 | Goto et al. | 477/131 |
| 5,195,036 | 3/1993 | Kimura et al. | 364/424.1 |

FOREIGN PATENT DOCUMENTS

| | | |
|---|---|---|
| 3615306A1 | 11/1986 | Germany . |
| 3806741A1 | 9/1988 | Germany . |
| 4112578A1 | 10/1991 | Germany . |
| 4110910A1 | 10/1991 | Germany . |
| 0065355 | 4/1983 | Japan .............................. 475/120 OR |
| 59-113346 | 6/1984 | Japan . |
| 3292454 | 12/1991 | Japan . |
| 3292455 | 12/1991 | Japan . |

*Primary Examiner*—Dirk Wright

[57] ABSTRACT

An automatic transmission control method and apparatus for a vehicle includes a first gear change mechanism in which an input shaft is connected to an output shaft of a fluid coupling and a rotational speed of the output shaft of the first gear change mechanism is changed by selectively controlling hydraulic oil supplied to and discharged from a plurality of first frictional engaging elements. It further includes a second gear change mechanism in which an input shaft is connected to the output shaft of the first gear change mechanism, the output shaft is connected to a driving wheel member and an output shaft rotational speed of the second gear change mechanism is controlled by selectively controlling the hydraulic oil supplied to and discharged from a plurality of second frictional engaging elements. When the first and second gear change mechanisms are operated simultaneously, the rotational speed change rates of the input shaft of the first and second gear change mechanisms are adjusted to predetermined rotational speed change rates by controlling the flow of the hydraulic oil with respect to the first and second plurality of frictional engaging elements.

25 Claims, 9 Drawing Sheets

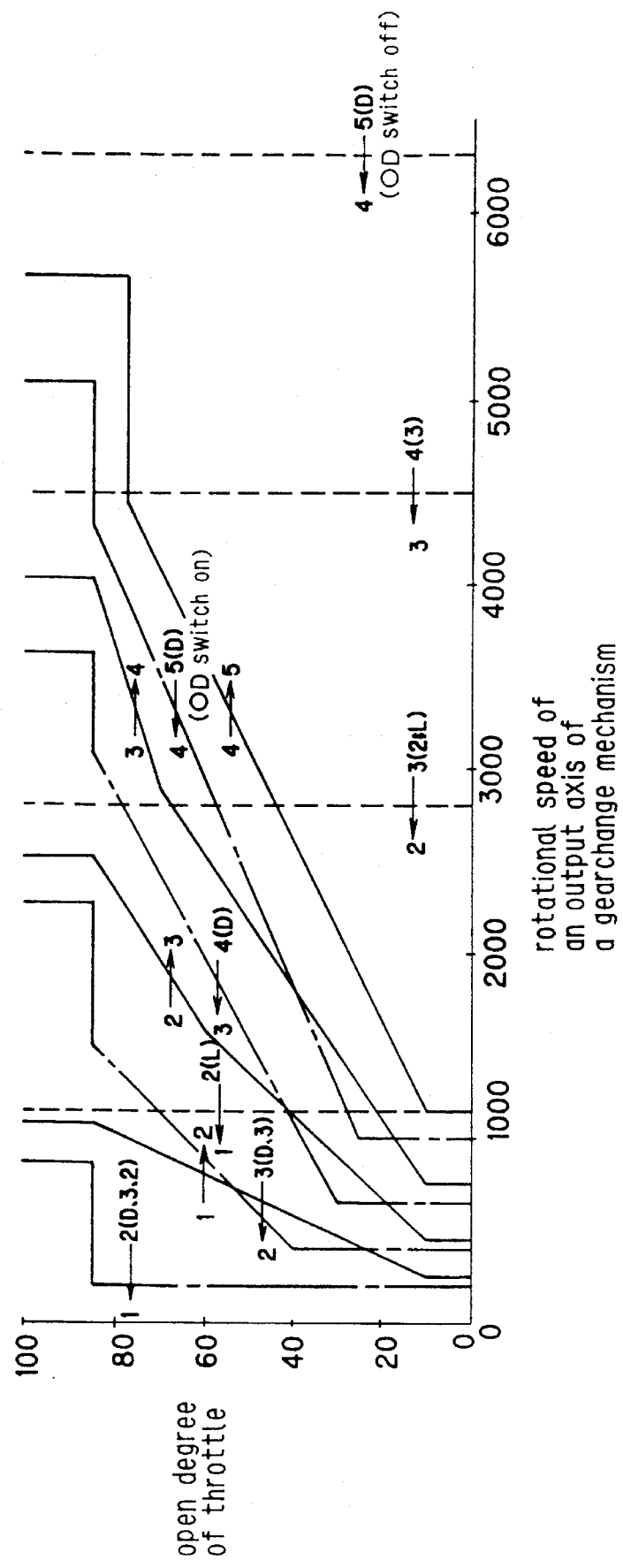

SHIFT CONTROL APPARATUS FOR AUTOMATIC TRANSMISSION AND CONTROL METHOD THEREFOR

BACKGROUND OF THE INVENTION

The present invention relates to a shift control apparatus for reducing gear change time without producing mechanical shock in the gear change operation of an automatic transmission in which two gear change mechanisms can change gears independently and are connected in series. The invention further relates to a control method therefor.

In an automatic transmission for a vehicle, a hydraulic pressure is selectively supplied to, and discharged from, frictional engaging elements such as clutches and brakes so that a gear change operation can be accomplished by some rotational elements of the automatic transmission. These rotational elements are connected to an input shaft of the transmission or fixed with respect to a casing of the gearbox in accordance with a drive condition of a vehicle.

If a shift control apparatus and frictional engaging elements are arranged along the shaft of the gearbox of the automatic transmission, particularly to that of the automatic transmission of more than four forward speeds, the size of the gearbox is elongated. If the longitudinal direction of a crank shaft is arranged perpendicular to the longitudinal direction of a car body, there are various practical problems.

Therefore, Japanese Patent Laid-Open Publication No. 59-113346 (1984) describes a compact automatic transmission in which two automatic gear change mechanisms capable of changing ratios of rotational speed independently are connected in series. One end of one gear change mechanism is connected to an output shaft of a fluid coupling and the other end is connected to an input shaft of another gear change mechanism. Further, the output shaft of the latter gear change mechanism is connected via an output shaft to a drive shaft.

The longitudinal length of the above described transmission can become shorter by arranging a first gear change mechanism and a second gear change mechanism in parallel. In this type of transmission, a first input shaft of the first gear change mechanism is coaxially connected to a crank shaft of a driving mechanism through a fluid coupling. A driving force is transmitted from a first output shaft of the first gear change mechanism to a second input shaft of the second gear change mechanism. The driving force is further transmitted to a drive shaft from the second output shaft of the second gear change mechanism. The first and second gear change mechanisms are thus provided in parallel. A first ratio of the rotational speed of the first output shaft connected to the second input shaft of the second gear change mechanism with respect to the first input shaft connected to the fluid coupling is changed in the first gear change mechanism. Further, a second ratio of the rotational speed of the second output shaft connected to the drive shaft with respect to the second input shaft connected to the first output shaft of the first gear change mechanism is simultaneously changed in the second gear change mechanism so that it is possible to shift a plurality of gear shifts, as desired. Plural frictional engaging elements are provided in the first gear change mechanism. Hydraulic oil is supplied to and discharged from the frictional engaging elements. The hydraulic oil is selectively supplied to the frictional engaging elements. Thereby the ratio of the rotational speed of the first output shaft of the first gear change mechanism is changed vis-á-vis the first input shaft. On the other hand, plural frictional engaging elements are also provided in the second gear change mechanism. The hydraulic oil is selectively supplied to those frictional engaging elements. Thereby the ratio of the rotational speed of the second output shaft of the second gear change mechanism is changed vis-á-vis the second input shaft.

In the automatic transmission in which two gear change mechanisms are arranged in parallel, shift shocks in the gear change operation independently occur in the respective gear change mechanisms. Therefore, it is designed not to change gear in the two gear change mechanisms at the same time. For example, if it is necessary to change a gear shift by operating the two gear change mechanisms in a conventional transmission, one gear change mechanism is operated and then the other gear change mechanism is operated in order to prevent a shift shock during the gear change operation.

If the gear is to be shifted to an adjacent gear ratio, one of two gear change mechanisms is operated. If the gear is to be shifted to a different gear ratio by skipping the adjacent gear ratio (hereinafter it is referred to as "skip operation"), one gear change mechanism is operated after an operation of the other gear change mechanism is completed. For example, if the gear is to be changed from the third forward speed to the fifth forward speed, the gear is shifted to the desired fifth forward speed after the gear is shifted to the fourth forward speed.

Therefore, in the above described conventional mechanism, there are practical problems. Although a skip operation is preferable, the gear is changed step by step. A period from the start to the end of the gear change operation becomes longer, a response characteristic with respect to the gear change becomes slow and a feeling of the gear change becomes dull.

OBJECT OF THE INVENTION

A first object of the present invention is to provide an automatic transmission in which two gear change mechanisms, capable of controlling rates of change of rotational speeds independently, are connected in series, the shock in the gear change operation is prevented from occurring during the skip operation and the period of the gear change operation can be shortened.

A second object of the present invention is to provide a control method for shortening the period of the gear change operation, without the shock occurring in a gear change operation during the skip operation in an automatic transmission, in which two gear change mechanisms can change the rate of change of rotational speeds independently and are connected in series.

SUMMARY OF THE INVENTION

The aforementioned objects, and other objects of the present application are fulfilled by providing an automatic transmission for a vehicle comprising a first gear change mechanism, of which an input shaft is coaxially connected to the crank shaft of an engine through an output shaft of a fluid coupling, and a second gear change mechanism, of which an input shaft is connected to the output shaft of the first gear change mechanism and an output is connected to a drive shaft. The two gear change mechanisms comprise a plurality of frictional engaging elements. Hydraulic oil is selectively supplied to the frictional engaging elements so that a rate of change of the rotational speed of the output shaft of the gear change mechanisms can be controlled. If a rate of change of a rotational speed of an input shaft of the first gear change mechanism (hereinafter, it is referred to as "first rate of change of the rotational speed") and a rate of change of a rotational speed of an input shaft of the second gear change mechanism (hereinafter, it is referred to as "second rate of change of the rotational speed") are defined as vFR and vSR, a frictional torque $T_F$ of frictional engaging elements of the first gear change mechanism and a frictional torque $T_S$ of frictional engaging elements of the second gear change mechanism are described in the following equations (1) and (2):

$$T_F = K1 \cdot T_E + K2 \cdot vFR + K3 \cdot vSR \quad (1)$$

$$T_S = K4 \cdot T_E + K5 \cdot vFR + K6 \cdot vSR \quad (2)$$

K1~K6 is a constant determined by each internal mass of rotational members disposed of the first and second gear change mechanisms, respectively. $T_E$ is a driving torque transmitted from a crank shaft of a driving mechanism to the input shaft of the first gear change mechanism through the output shaft of the fluid coupling device.

If there is a difference $\Delta vF$ between the first rate of change of the rotational speed vFR and a desired rate of change of rotational speed of the input shaft of the first gear change mechanism (hereinafter it is referred to as "a first desired rate of change of the rotational speed) and a difference $\Delta vS$ between the second rate of change of the rotational speed vSR and a desired rate of change of rotational speed of the input shaft of the second gear change mechanism (hereinafter it is referred to as "a second desired rate of change of the rotational speed), a torque difference $\Delta TF$ of the frictional torque $T_F$ of frictional engaging elements of the first gear change mechanism corresponding to the difference $\Delta T_F$ and a torque difference $\Delta T_S$ of the frictional torque $T_S$ of frictional engaging elements of the second gear change mechanism corresponding to the difference $\Delta TS$ are explained in the following equations (3) and (4).

$$\Delta T_F = K2 \cdot \Delta vF + K3 \cdot vS \quad (3)$$

$$\Delta T_S = K5 \cdot \Delta vF + K6 \cdot vS \quad (4)$$

$$\Delta vF + (K3/K2)\Delta vS = \Delta\omega F \quad (5),$$

$$\Delta vS + (K5/K6)\Delta vF = \Delta\omega S \quad (6).$$

Herein, new variables of state $\Delta\omega F$ and $\Delta\omega S$ are designated as the above equations (5) and (6), respectively. If the equations (5) and (6) are inserted into the equations (3) and (4), the following equations (7) and (8) are obtained:

$$\Delta T_F = K2 \cdot \Delta\omega F \quad (7),$$

$$\Delta T_S = K6 \cdot \Delta\omega S \quad (8).$$

By feedback controlling the variables of state $\Delta\omega F$ and $\Delta\omega S$ as shown in the equations (7) and (8), an interference with the gear change control of the first gear change mechanism and the second gear change mechanism can be avoided. Therefore, it is possible to operate the gear change control as similar to the conventional automatic transmission having one gear change mechanism.

When a PID control is operated, a corrective duty ratio $\Delta D_F$ (hereinafter it is referred to as "first gear change corrective duty ratio") for a duty ratio $D_F$ of a hydraulic pressure applied to frictional engaging elements of the engaging members of the first gear change mechanism (hereinafter it is referred to as "first gear change control duty ratio") and a corrective duty ratio $\Delta D_S$ (hereinafter it is referred to as "second gear change corrective duty ratio") for a duty ratio $D_S$ of a hydraulic pressure applied to the frictional engaging elements of the engaging members of the second gear change mechanism (hereinafter it is referred to as "second gear change control duty ratio") are determined as shown in the following equations (9) and (10):

$$\Delta DF = KPF \cdot \Delta\omega F + KIF \int \Delta\omega F \, dt + KDF \cdot d(\Delta\omega F)/dt \quad (9)$$

$$\Delta DS = KPS \cdot \Delta\omega S + KIS \int \omega S \, dt + KDS \cdot d(\Delta\omega S)/dt \quad (10)$$

Herein, KPF, KIF, KDF, KPF, KIS and KDS is constant for the PID control, respectively.

A shift control apparatus of an automatic transmission of a first embodiment of the present invention has been invented in the context of the above described considerations.

The shift control apparatus of the automatic transmission for a vehicle comprises a fluid coupling connected to a driving mechanism, a first gear change mechanism of which an input shaft is connected to the fluid coupling, a second gear change mechanism of which an input shaft is connected to an output shaft of the first gear change mechanism and the output shaft is connected to a driving shaft, a first hydraulic pressure control means for controlling a rate of change of the output shaft with respect to the input shaft of the first gear change mechanism by selectively supplying and discharging a hydraulic oil to and from a plurality of frictional engaging elements provided in the first gear change mechanism, and a second hydraulic pressure control means for controlling a rate of change of a rotational speed between the input shaft and the output shaft of the second gear change mechanism. The shift control apparatus comprises an actual first input shaft rotational speed change rate detecting means for calculating a rate of change of an actual rotational speed of the input shaft of the first gear change mechanism, a desired first input shaft rotational speed change rate setting means for setting a desired rotational speed change rate of the input shaft of the first gear change mechanism, an actual second input shaft rotational speed change rate detecting means for calculating a rate of change of an actual rotational speed of the input shaft of the second gear change mechanism, a desired second input shaft rotational speed change rate setting means for setting a desired rotational speed change rate of the input shaft of the second gear change mechanism, a first corrective means for correcting a control signal output to the first hydraulic pressure control means in order to coincide the actual rate of change of the rotational speed of the input shaft of the first gear change mechanism and the desired rate of change of the rotational speed of the input shaft of the gear change mechanism and a second corrective means for correcting a control signal output to the second hydraulic pressure control means in order to coincide the actual rate of change of the rotational speed of the input shaft of the second gear change mechanism and the desired rate of change of the rotational speed of the input shaft of the gear change mechanism.

Further objects of the present invention of the present application are fulfilled by providing a gear change control method for controlling an automatic transmission according to a second embodiment of the present invention in a gear change control device of an automatic transmission for a vehicle comprising a fluid coupling connected to a driving mechanism, a first gear change mechanism of which an input shaft is connected to the fluid coupling, a second gear change mechanism of which an input shaft is connected to an output shaft of the first gear change mechanism and an output shaft of the second gear change mechanism is connected to a drive shaft, a first hydraulic pressure control means for controlling a rate of change of the output shaft with respect to the input shaft of the first gear change mechanism by selectively supplying and discharging a hydraulic oil to and from a plurality of frictional engaging elements provided in the first gear change mechanism, and a second hydraulic pressure control means for controlling a rate of change of a rotational speed between the input shaft and the output shaft of the second gear change mechanism. The gear change control method comprises the steps of detecting an actual rate of change of a rotational speed of the input shaft of the first gear change mechanism; setting a desired rate of change of a rotational speed of the input shaft of the first gear change mechanism; detecting an actual rate of change of a rotational speed of the input shaft of the second gear change mechanism; setting a desired rate of change of a rotational speed of the input shaft of the second gear change mechanism; correcting a control signal output to the first hydraulic pressure control means in order to coincide the actual rate of change of the rotational speed of the input shaft of the first gear change mechanism and the desired rate of change of the rotational speed of the input shaft of the first gear change mechanism; and correcting a control signal output to the second hydraulic pressure control means in order to coincide the actual rate of change of the rotational speed of the input shaft of the second gear change mechanism and the desired rate of change of the rotational speed of the input shaft of the second gear change mechanism.

When a skip operation is actuated, that is, the first gear change mechanism and the second gear change mechanism are operated simultaneously, the desired rates of change of the rotational speed of the input shafts of the first and second gear change mechanisms are determined in order to coincide a timing for finishing the gear change of the first gear change mechanism and a timing for finishing the gear change of the second gear change mechanism and a supply of a hydraulic oil with respect to the frictional engaging elements are controlled in order to coincide the actual rates of change of the rotational speed of the input shafts of the first and second gear change mechanisms and the desired rates of change of the rotational speed of the input shafts of the first and second gear change mechanisms, respectively.

Thereby, the timing for finishing the gear change of the first gear change mechanism and the timing for finishing the gear change of the second gear change mechanism are coincided so that a driving torque is not displaced so much during the skip operation.

According to an embodiment of the present invention, in an automatic transmission in which two gear change mechanisms which are operated independently and connected in series, if the first and second gear change mechanisms are operated simultaneously to accomplish a desired gear shift, the hydraulic oil is controlled to supply the frictional engaging elements in order to coincide the rates of change of rotational speed of the input shafts of the first and second gear change mechanisms and the desired rate of change of rotational speed, respectively. Thus, the timing for finishing the gear change of the first gear change mechanism and the timing for finishing the gear change of the second gear change mechanism can be coincided. Therefore, it is possible to avoid displacing a driving torque so much in the skip operation. That is, the first gear change mechanism and the second gear change mechanism are operated simultaneously.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 shows the relationship of selecting each gear shift to a combination between a speed of an output shaft of a gearbox and throttle opening.

DETAILED DESCRIPTION OF THE PREFERRED EMBODIMENT

Figure 1:
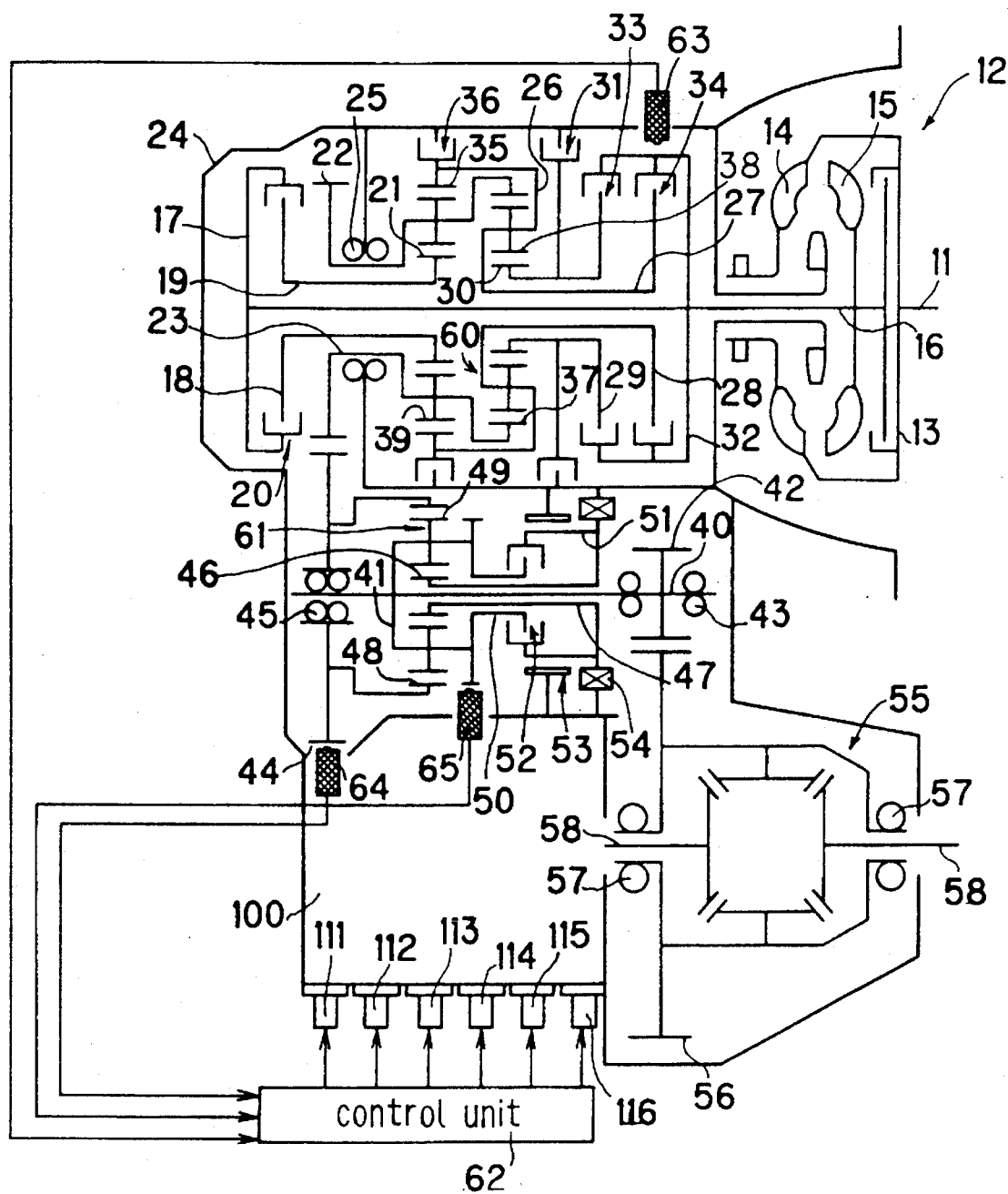
FIG. 1 shows a skeleton view of one embodiment of a shift control apparatus according to the present invention applied to an automatic transmission of five forward speeds for a vehicle.

FIG. 1 is a skeleton view of one embodiment of a power transmission mechanism according to the present invention applied to an automatic transmission with five forward speeds and one reverse speed, equipped for use with a front wheel drive vehicle. A shaft 11 connected to a crank shaft of a prime mover (not shown), is connected to a pump 14 integrally formed with an input casing 13 of a torque converter 12 affected as a fluid coupling. A turbine 15 of the torque converter 12 confronting with the pump 14 is integrally formed with a 1-4 clutch retainer 17 through a first gearbox input shaft 16 affected as an input shaft of a first gear change mechanism. A 1-4 clutch hub 18 confronting with the 1-4 clutch retainer 17 is formed at one end of a first sleeve 19. The first sleeve 19 can be rotated freely with respect to the first gearbox input shaft 16. A 1-4 clutch 20 for changing gear engagement is provided between the 1-4 clutch retainer 17 and the 1-4 clutch hub 18.

A first sun gear 21 is formed at an opposite end of the first sleeve 19. A first carrier 23 is provided at a first sleeve 19 between the first sun gear 21 and the 1-4 clutch hub 18. A transmission gear 22 is formed at one end of the first carrier 23. The first carrier 23 can be rotated with respect to the first sleeve 19. A bearing 25 is provided for rotating the first carrier 23 provided as an output shaft of the first gear change mechanism and a gearbox case 24.

On the other hand, a second sleeve 27 is integrally formed with a second carrier 26 at one end of the second sleeve 27. The second sleeve 27 is freely rotatable at the first gearbox input shaft 16 positioned between the torque converter 12 and the first sleeve 19. A 3-5 clutch hub 28 is integrally formed at an opposite end of the second sleeve 27. A second sun gear 30 integrally formed with a clutch brake hub 29 is rotatably provided for engaging with the second sleeve 27 at a position between the second carrier 26 and the 3-5 clutch hub 28.

A 2-5 brake 31 for switching a rotational engagement of the clutch brake hub 29 is provided at a position between one end of the clutch brake hub 29 (left side in FIG. 1) and the gearbox casing 24. A twin clutch retainer 32 is integrally formed with the first gearbox input shaft 16. The twin clutch retainer 32 surrounds the opposite end of the clutch brake hub 29 (right side in FIG. 1) and the 3-5 clutch hub 28. A reverse clutch 33 and a 3-5 clutch 34 for switching a gear engagement is provided at a position between the twin clutch retainer 32 and a clutch brake hub 29 and a position between the twin clutch retainer 32 and the 3-5 clutch hub 28, respectively.

A first internal gear 35 confronting with the first sun gear 21 is protrudedly and integrally formed with the second carrier 26. A 1-R (reverse) brake 36 for switching a rotational engagement of the second carrier 26 together with the first internal gear 35 is provided between an outer peripheral surface of the first internal gear 35 and the gearbox casing 24.

A second planet gear 38 for engaging with a second internal gear 37 integrally formed at the opposite end of the first carrier 23 and the second sun gear 30 is rotatably provided at the second carrier 26. Likewise, a first planet gear 39 for engaging with the first internal gear 35 and the first sun gear 21 is rotatably provided.

A second gearbox output shaft 40, affected as an output shaft of a second gear change mechanism, is provided parallel to the first gearbox input shaft 16. A cylinder-shaped third carrier 41 is rotatably supported by the gearbox casing 24 and the third carrier 41 is provided at one end of the second gearbox output shaft 40 through a bearing (not shown). The other end of the second gearbox output shaft 40 formed with a front wheel output gear 42, is rotatably and directly supported by a bearing 43 with respect to the gearbox casing 24.

A follower gear 44 as an input shaft of the second gear change mechanism for engaging with a transmission gear 22 is rotatably provided at the second gearbox output shaft 40 through a bearing 45. The second gearbox output shaft 40 positioned between the third carrier 41 and the front wheel output gear 42 is rotatably engaged with a third sleeve 47. A third sun gear 46 is formed at one end of the third sleeve 47. A third internal gear 48 confronting with the third sun gear 46 is integrally formed with the follower gear 44. A third planet gear 49 engages with the third sun gear 46 and the third internal gear 48 and the third planet gear 49 is rotatably provided at the third carrier 41.

At the opposite end of the third carrier 41, a 4-5 clutch hub 50 is integrally and protrudedly formed. A 4-5 clutch retainer 51 for surrounding the 4-5 clutch hub 50 is fixed at the opposite end of the third sleeve 47. A 4-5 clutch 52 for switching a gear engagement is provided a position between the 4-5 clutch hub 50 and the 4-5 clutch retainer 51. A reverse brake 53 for switching a rotational engagement of the third sleeve 47 together with the 4-5 clutch retainer 51 is provided at a position between an outer peripheral surface of the 4-5 clutch retainer 51 and the gearbox casing 24.

A one-way clutch 54 for controlling a rotational direction of the third sleeve 47 is provided between the opposite end of the third sleeve 47 and the gearbox case 24.

Table 1 shows a relation between engaging conditions of each frictional engaging elements and corresponding gear shifts. As shown in Table 1, a fifth forward speed and one reverse gear operation can be accomplished by respective combinations of each of clutches 20, 33, 34 and 52 and each of brakes 31, 36 and 53. In Table 1, a white circle (o) means that frictional engaging elements are engaged and a cross (x) means that the one-way clutch 54 activates to stop the rotation of the third sleeve 47 while a driving force is transmitted to the second gearbox output shaft 40.

TABLE 1

|              | 1st | 2nd | 3rd | 4th | 5th | Reverse | Neutral |
|---|---|---|---|---|---|---|---|
| 1-R brake 36 | o |   |   |   |   | o | o |
| 2-5 brake 31 |   | o |   |   | o |   |   |
| 1-4 clutch 20 | o | o | o | o |   |   |   |
| 3-5 clutch 34 |   |   | o | o | o |   |   |
| R brake 53   | o | o | o |   |   | o | o |
| 4-5 clutch 52 |   |   |   | o | o |   |   |
| R clutch 33  |   |   |   |   |   | o |   |
| 1 way clutch 54 | x | x | x |   |   |   |   |

An input gear 56 of a front differential gear 55 engages with the front wheel output gear 42 of the second gearbox output shaft 40. The front differential gear 55 is rotatably supported at the both ends thereof by the gearbox casing 24 through bearings 57. A pair of drive shafts 58 connected to right- and left- front wheels (not shown) through universal couplings (not shown) are provided at the front differential gear 55.

The first through third planet gears 38, 39 and 49 are attached to the three planet gear devices 59, 60, and 61, respectively. The clutches 20, 33, 34 and 52 and the brakes 31, 36 and 53 comprise a piston device and a servo device (not shown), respectively and are affected as frictional engaging elements against rotational members of the three planet gear devices 59, 60 and 61. The clutches 20, 33, 34 and 52 and the brakes 31, 36 and 53 can be engaged and released by controlling hydraulic oil.

In the gearbox casing 24, a first input shaft rotation sensor 63 which confronts with the twin clutch retainer 32 and detects a rotational speed of the first gearbox input shaft 16 integrally formed with the twin clutch retainer 32, a second input shaft rotation sensor 64 which confronts with the follower gear 44 affected as an input shaft of the second gear change mechanism and detects a rotational speed of the follower gear 44 and a second output shaft rotation sensor 65 which confronts with the third carrier 41 integrally with the 4-5 clutch hub 50 and detects a rotational speed of the second gearbox output shaft 40 are provided. These detected signals are output to an electronic control unit 62. When the 1-4 clutch 20, the 1-R brake 36, the reverse brake 53 are engaged to obtain the first forward speed, the second carrier 26 of the second planet gear device 60 and the third sleeve 47 of the third planet gear device 61 are prevented from rotation. A driving force from the shaft 11 is transmitted from a transmission gear 22 to a follower gear 44 via the torque converter 12, the first gearbox input shaft 16, the 1-4 clutch 20, the first sun gear 21, and the first planet gear 39 of the first planet gear device 59 and the first carrier 23. The driving force is further transmitted from the third internal gear 48, the third planet gear 49 and the third carrier of the third planet gear device 61 to the second gearbox output shaft 40. Thus, a gear change of the first forward speed is accomplished and the driving force is transmitted to the both drive shafts 58 via a front wheel output gear 42, the input gear 56 and the front differential gear 55.

To obtain the second forward speed, the 1-4 clutch 20 and the reverse brake 52 are engaged, the 1-R brake 36 is released and the 2-5 brake is engaged so that the second sun gear 30 of the second planet gear device 60 and the third sleeve 47 of the third planet gear device 61 are prevented from rotation. A driving force from the shaft 11 is transmitted to the transmission gear 22 and to the follower gear 44 via the first sun gear 21, the first planet gear 39 and the first internal gear 35 of the first planet gear device 59, the second carrier 26, the second planet gear 38 and the second internal gear 37 of the second planet gear device 60 and the first carrier 23. The driving force is further transmitted to the third internal gear 48, the third planet gear 49, the third carrier 41 of the third planet gear device 61, and to the second gearbox output shaft 40. Thus, a gear change of the second forward speed is accomplished.

To obtain the third forward speed, the 1-4 clutch 20 and the reverse brake 53 are engaged, the 2-5 brake 31 is released and an over drive clutch 34 is engaged, so that the second carrier 26 of the second planet gear device 60 rotates together with the input shaft 16 and the third sleeve 47 of the third planet gear device 61 is prevented from rotation. The driving force from the shaft 11 is transmitted from the 1-4 clutch 20 to the first sun gear 21 of the first planet gear device 59. The driving force is also transmitted from the 3-5 clutch 34 to the second carrier 26 of the second planet gear device 60 and the integrated first internal gear 35. By rotating the first sun gear 21 and the first internal gear 35 together, a rotation of the first gearbox input shaft 16 can be transmitted from the transmission gear 22 to the follower gear 44 via the first planet gear 39 and the first carrier 23. The driving force is further transmitted from the third internal gear 48, the third planet gear 49 and the third carrier 41 of the third planet gear device 61 to the second gearbox output shaft 40. Thus, a gear change of the third forward speed is accomplished.

To obtain the fourth forward speed, the 1-4 clutch 20 and the 3-5 clutch 34 are engaged, the reverse brake 53 is released and the 4-5 clutch 52 is engaged so that the second carrier 26 of the second planet gear device 61 rotates with the input shaft 16 and the second carrier 26 becomes integrated with the third sleeve 47 and the third carrier 41 of the third planet gear device 61. By rotating the second sun gear 30 and the second carrier of the second planet gear device 60 together, a rotation of the follower gear 44 is transmitted to the second gearbox output shaft 40. As the result, in an embodiment of the present invention, a gear change of the fourth forward speed is accomplished while the revolution numbers of the first gearbox input shaft 16 is the same to that of the second gearbox output shaft.

To obtain the fifth forward speed, the over drive clutch 34 and the 4-5 clutch 52 are engaged, the 1-4 clutch 20 is released and the 2-5 brake 31 is engaged so that the second sun gear 30 of the second planet gear device 60 is prevented from rotation. A driving force from the shaft 11 is transmitted from the second carrier 26 integrated with the second sleeve 27 to the second planet gear 38, the second internal gear 37 and the first carrier 23. Thus, a gear change of the fifth forward speed is accomplished in which a rotation speed of the transmission gear 22 is faster than that of the first gearbox input gear 16.

To obtain the reverse speed, only the reverse clutch 33, the 1-R brake 36 and the reverse brake 53 are engaged, so that the second carrier 26 of the second planet gear device 60 and the third sleeve 47 of the third planet gear device 61 are prevented from rotation. A driving force from the shaft 11 is reversely transmitted from the reverse clutch 33 to the second sun gear 30, the second planet gear 38 and the second internal gear 37 of the second planet gear device 60. The driving force is further transmitted to the transmission gear 22 and then to the follower gear 44 via the first carrier 23 integrated with the second internal gear 37. Thus, the driving force is transmitted from the third internal gear 48, the planet gear 49 and the third carrier 41 of the third planet gear device 61 to the second gearbox output shaft 40 so that a gear change of the reverse speed is accomplished.

To obtain the neutral speed, the 1-R brake 36 and the reverse brake 53 are engaged, the reverse clutch 33 is released so that a driving force from the shaft 11 is only transmitted to the first gearbox input shaft 16.

Figure 2A:
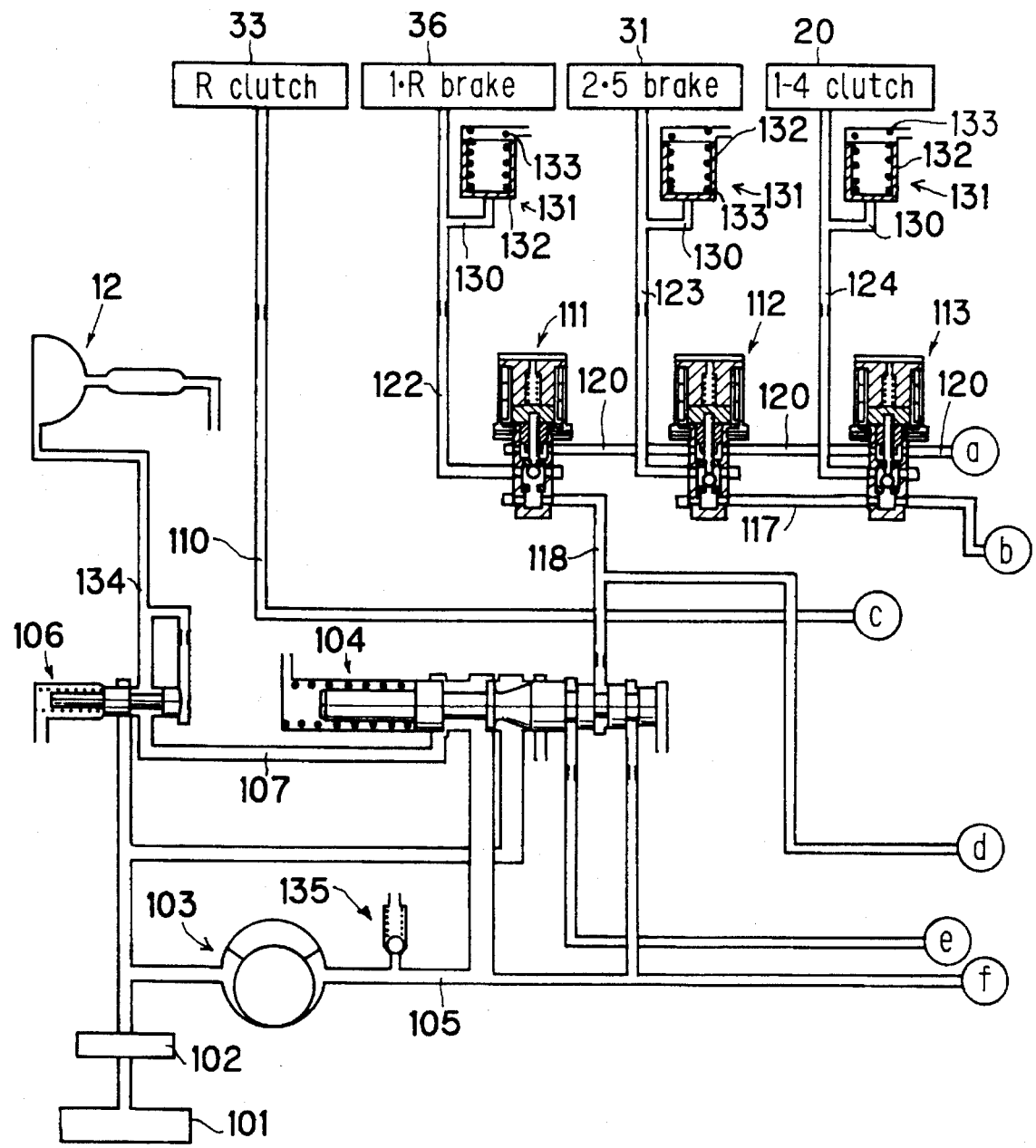
FIGS. 2A and 2B show a main part of a hydraulic pressure control circuit according to an embodiment of the present invention.
Figure 2B:
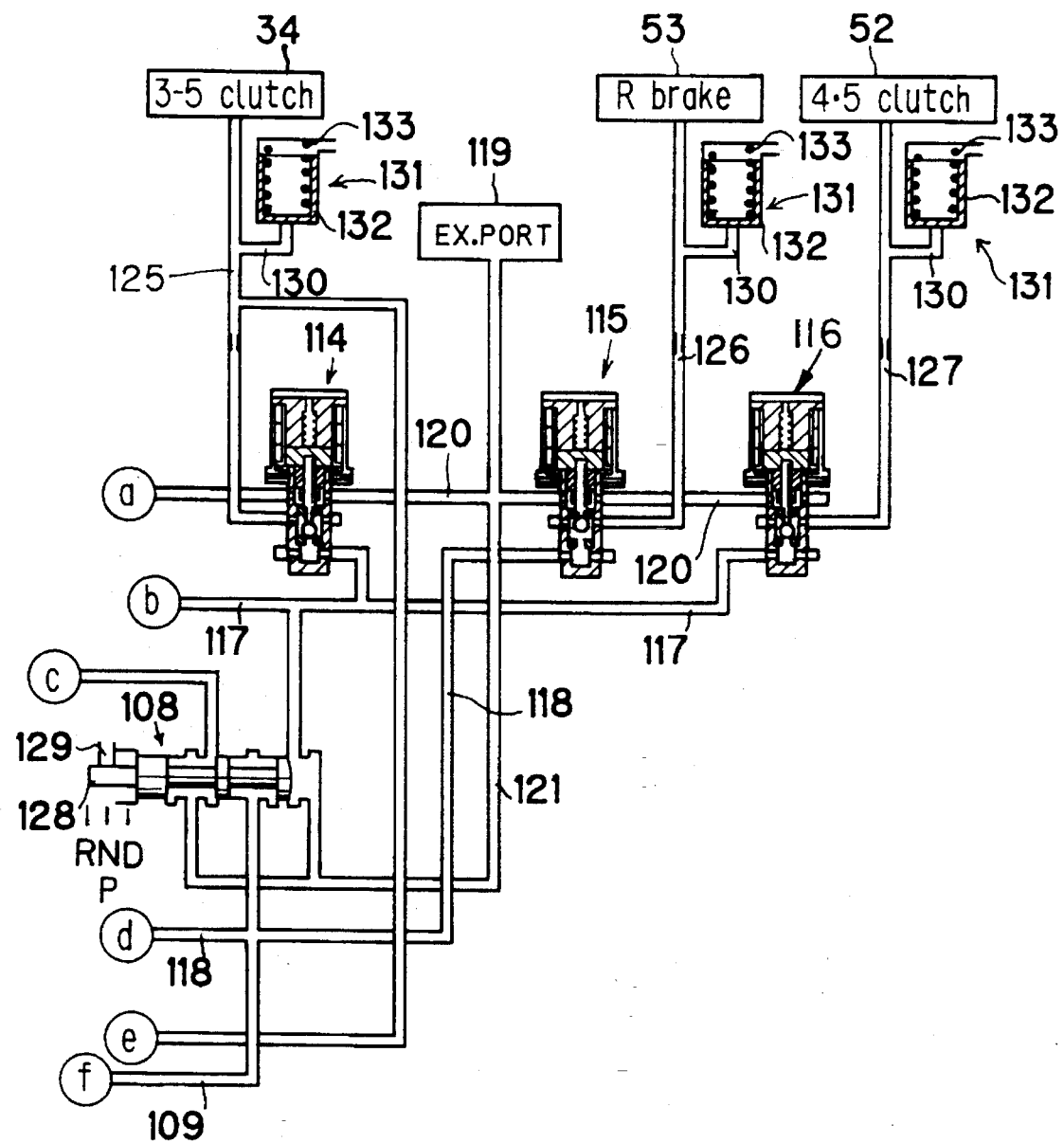

To accomplish each of the gear changes as shown in Table 1, a hydraulic oil control device 100 for controlling hydraulic oil supplied to the above described clutches 20, 33, 34 and 52 and the above described brakes 31, 36 and 53 is provided under the gearbox casing 24. A main structure of the hydraulic oil control device 100 of the embodiment according to the present invention is shown in FIGS. 2A and 2B.

In the hydraulic oil control device 100, hydraulic oil is pumped from an oil tank 101 to the torque converter 12 through an oil filter 102 by an oil pump 103. Simultaneously, the hydraulic oil is selectively supplied to, and returned from, the piston devices or the servo devices (not shown) of the clutches 20, 33, 34 and 52 and the brakes 31, 36 and 56 in accordance with a driving condition of a vehicle in order to control the engagement and the release of the above devices. A fundamental structure and an operation of the hydraulic oil control device are already known.

In the down stream of the oil pump 103, a pressure control valve 104 is provided for adjusting the oil pressure amount at a predetermined pressure level (it is called a line pressure) an oil path 105. The pressure control valve 104 is connected to a torque converter control valve 106 for controlling an oil pressure in the torque converter 12 through an oil path 107. A manual valve 108 operated by a shift change lever (not shown) is connected to the oil path 105 through the oil path 109. A driver operates the shift change lever to one of the ranges, which are P (parking) range for parking, R range for reverse driving, N (neutral) range for idling, D (drive) range for changing gears between the first forward speed through the fifth forward speed, 3 range for changing gears between the first forward speed through the third forward speed, 2 range for changing gears between the first forward speed and the second forward speed and L (low) range for fixing a gear shift at the first forward speed. The manual valve 108 connected to the oil path 105 through the oil path 109 is actuated in accordance with the selected range.

The manual valve 108 is further connected to the reverse clutch 33 through an oil path 110 and four electromagnetic switch valves 112 through 114 and 116 for controlling hydraulic oil with respect to the clutches 20, 34 and 52 and the 2-5 brake 31. The two electromagnetic switch valves 111 and 115 for controlling hydraulic oil with respect to the brake 26 and 53 are connected to the oil path 118 on the way of the oil path 109.

The above described six electromagnetic switch valves 111 through 116 are three-way valves which are closed during a non-conducting period and actuated in accordance with electric signals of a duty control from the electronic control unit 62 as shown in FIG. 1. These switch valves are connected each other via an oil discharge path 120 connected to an oil discharge port 119. An ON/OFF electric conditions of the electromagnetic switch valves with respect to each gear shifts are shown in Table 2.

The table 2 shows each conductive conditions of the switch valves corresponding to respective gear shifts.

TABLE 2

|  | 1st | 2nd | 3rd | 4th | 5th | R | N |
|---|---|---|---|---|---|---|---|
| 1st electromagnetic switch valve 111 | ON | OFF | OFF | OFF | OFF | ON | ON |
| 2nd electromagnetic switch valve 112 | OFF | ON | OFF | OFF | ON | OFF | OFF |
| 3rd electromagnetic switch valve 113 | ON | ON | ON | ON | OFF | OFF | OFF |
| 4th electromagnetic switch valve 114 | OFF | OFF | ON | ON | ON | OFF | OFF |
| 5th electromagnetic switch valve 114 | ON | ON | ON | OFF | OFF | ON | ON |
| 6th electromagnetic switch valve 116 | OFF | OFF | OFF | ON | ON | OFF | OFF |

The oil discharge path 120 is also connected to the manual valve 108 through the oil discharge path 121.

The first electromagnetic switch valve 111 and the 1-R brake 36 are connected through an oil path 122 to control hydraulic oil for the 1-R brake 36. Likewise, the second electromagnetic switch valve 112 and the 2-5 brake 31 are connected through an oil path 123 to control hydraulic oil for the 2-5 brake 31. The third electromagnetic switch valve 113 and the 1-4 clutch 20 are connected through an oil path 124 to control hydraulic oil for the 1-4 clutch 20. The fourth electromagnetic switch valve 114 and the 3-5 clutch 34 are connected through an oil path 125 to control hydraulic oil for the 3-5 clutch 34. The fifth electromagnetic switch valve 115 and the reverse brake 53 are connected through an oil path 126 to control hydraulic oil for the reverse brake 53. The sixth electromagnetic valve 116 and the 4-5 clutch 52 are connected through an oil path 127 to control hydraulic oil for the 4-5 clutch 52.

In this embodiment, a notch 129 formed on a spool 128 of the manual valve 108 has three switching positions, which are R position, N position and D position. As described above, the shift lever affects to the manual valve 108. The notch 129 of the manual valve 108 is located at the N position if the shift lever is shifted to the P range or the N range. The notch 129 is located at the R position if the shift lever is shifted to the R range and is located at the D position if the shift lever is shifted to the drive range, the 3 range, the 2 range and the L range. The fifth forward speed automatic transmission for automatically changing gear shifts between the first forward speed to the fifth forward speed or the fourth forward speed automatic transmission for automatically changing a gear shift between the first forward speed to the fourth forward speed are selectively switched by operating an auxiliary switch (hereinafter, it is referred to as "OD switch") (not shown) when the shift change lever is shifted to the D range.

If the shift change lever is shifted to one of the ranges, i.e. the D-range, the 3-range, the 2-range and the L-range by a driver, the notch 129 formed at the spool 128 of the manual valve 108 is moved to the D position. A suitable gear position is selected corresponding to a driving condition of the vehicle depending on a relation between six electromagnetic switch valves 111 through 116 of which a conductive amount is duty controlled. If the shift change lever is selected to the P-range or the N-range, the notch of the spool 128 is moved to the N position so that a neutral condition is accomplished. If the shift change lever is selected to the R-range, the notch 129 of the spool 128 is moved to the R-position, and the automatic transmission changes to a reverse gear.

In such an embodiment of the present invention, to absorb a shock which occurs when engaging the clutches 20, 34 and 52 and the brakes 31, 36 and 53 accumulators 131 is connected to each of the oil paths 122 through 127 through shock absorbing oil paths 130 divided from each the oil paths 122 through 127, respectively.

Each accumulator 131 comprises a piston 132 against the shock absorbing oil path 130 and a compression spring 133 for energizing the piston 132 toward the shock absorbing oil path 130. The piston 132 moves vertically in accordance with any displacement in the hydraulic oil pressure in the shock absorbing oil path 130, thus the shock when engaging the clutches and brakes can be absorbed.

Accordingly, if the shift change lever (not shown) is selected in the P-range or the N-range, the notch 129 formed at the spool 128 of the manual valve 108 is moved to the N position as shown in FIGS. 2A and 2B. The hydraulic oil pumped from the hydraulic pump 103 is supplied from the oil path 105 to the pressure control valve 104 and the manual valve 108. On the other hand, the hydraulic oil flows from the pressure control valve to the torque convertor control valve 106 through the hydraulic oil path 107. Thus, hydraulic oil at a predetermined pressure is supplied to the torque converter 12 through an oil path 134, which connects the torque converter control valve 106 and the torque converter 122. The hydraulic oil supplied to the manual valve 108 is supplied to the first electromagnetic switch valve 111 and the fifth electromagnetic switch valve 115, which are in the "On" condition through the hydraulic oil path 118 divided from the hydraulic path 109 which is connected to the manual valve 108. Under this condition, the other four electromagnetic switch valves 112 through 114 and 116 are maintained in the "Off" condition.

As a result, an oil discharge path 120 connected to the oil discharge port 119 is connected to the oil paths 123 through 125 and 127 through the remaining four electromagnetic switch valves 112 through 114 and 127 and an oil discharge path 121 connected to the oil discharge path 119 is connected to the oil path 110 through the manual valve 108. Hydraulic oil is discharged from the clutches 20, 33, 34 and 52 and the 2-5 brake 31 connected thereto. Thereby, the clutches 20, 33, 34 and 52 and the 2-5 brake 31 are released. On the other hand, the oil path 118 is connected to the oil path 122 through the first electromagnetic switch valve 111 and the oil path 118 is connected to the oil path 126 through the fifth electromagnetic switch valve 115 so that the line pressure from the hydraulic pump 103 is transmitted to the 1-R brake 36 through the oil paths 105, 109, 118 and 122 and the line pressure is transmitted to the reverse brake 53 through the oil paths 105, 109, 118 and 126. The gear is shifted to neutral by engaging the brakes 36 and 53.

If the shift change lever is shifted to one of the ranges, the D-range, the 3-range, the 2-range and the L-range by a driver, the notch 129 formed at the manual valve 108 is moved to the D position. Hydraulic oil from the oil path 109 is supplied from the oil path 118 to the two electromagnetic switch valves 111 and 115 and the hydraulic oil is supplied from the oil path 117 to the four electromagnetic switch valves 112 through 114 and 116 through the manual valve 108.

If only the first, third and fifth electromagnetic switch valves 111, 113 and 115 become the "On" condition by the electro control unit 62, the oil discharge path 120 is connected to the oil paths 123, 125 and 127 through the second, fourth and sixth electromagnetic switch valves 112, 114 and 116. Hydraulic oil is discharged from the clutches 33, 34 and 52 and the 2-5 brake 31 so that the clutches 33, 34 and 52 and the 2-5 brake 31 are released. On the other hand, the line pressure from the hydraulic pump 103 is transmitted to the 1-rear brake 36 and the rear brake 53 through the first and fifth electromagnetic switches valves 111 and 115 which are in the "On" condition, respectively. Further, the third electromagnetic switch valve 113 is in the "On" condition, the line pressure is supplied from the oil paths 105 and 109 to the 1-4 clutch 20 through the manual valve 108 by the oil paths 117 and 124. As the result, the gear transmission is shifted to the first forward speed by engaging the brakes 36 and 53 and the 1-4 clutch 20.

When the shift lever is selected to one of the ranges from the D-range, the 3-range and the 2-range, and if only the second, third and fifth electromagnetic switch valves 112, 113 and 115 become the "On" condition by the electronic control unit 62, the oil discharge path 120 is connected to the oil paths 122, 125 and 127 through the first, fourth and sixth electromagnetic switch valves 111, 114 and 116, respectively. Further, the oil discharge path 121 is connected to the oil path 110 through the manual valve 108. Hydraulic oil is discharged from the clutches 33, 34 and 52 and the 1-rear brake 36 connected thereto, so that the clutches 33, 34 and 52 and the 2-5 brake 31 are released. On the other hand, the line pressure from the pump 103 is transmitted to the 1-4 clutch 20 and the rear brake 53 through the third and fifth electromagnetic switch valves 113 and 115 which are in the "On" condition. When the second electromagnetic switch valve 112 is in the "On" condition, the line pressure is supplied from the oil paths 105 and 109 to the 2-5 brake 31 through the manual valve 108 by the oil paths 117 and 123. As a result, the automatic transmission is shifted to the second forward speed by engaging the brakes 31 and 53 and the 1-4 clutch 20.

While the shift changes lever is selected to be in one of the ranges, that is, the D-range and the 3-range, if the only the third through fifth electromagnetic switch valves 113 through 115 becomes the "On" condition by the electric control unit 62, the oil discharge path 120 is connected to the oil paths 122, 123 and 127 through the first, second and sixth electromagnetic switch valves 111, 112 and 116, respectively. Hydraulic oil is discharged from the clutches 33 and 52 and the brakes 31 and 36 connected thereto, so that the clutches 33 and 52 and the brakes 31 and 36 are released. Further, when the fourth electromagnetic switch valve 114 is in the "On" condition, the line pressure is transmitted from the oil paths 105 and 109 to the 3-5 clutch 34 through the manual valve 108 by the oil paths 117 and 125. As the result, the automatic transmission is shifted to the third forward speed by engaging the clutches 20 and 34 and the brakes 53.

When the shift change lever is selected to the D-range, and if only the third, fourth and sixth electromagnetic switch valves 113, 114 and 116 become the "On" condition by the electronic control unit 62, hydraulic oil is discharged from the brakes 31, 36 and 53 connected to the first, second and fifth electromagnetic switch valves 111, 112 and 115 which are in the "Off" condition. Then, the brakes 31, 36 and 53 and the rear clutch 33 are released. On the other hand, the line pressure from the hydraulic pump 103 is sent to the clutches 20 and 34 through the third and fourth electromagnetic switch valves 113 and 114 which are in the "On" condition, respectively. When the sixth electromagnetic switch valve 116 is in the "On" condition, the line pressure is supplied from the oil paths 105 and 109 to the 4-5 clutch 52 through the manual valve 108 by the oil path 117 and 127, respectively. As the result, the automatic transmission is shifted to the fourth forward speed by engaging the clutches 20, 34 and 52.

When the shift change lever is set to the D-range and the OD switch is in the "On" condition, and if only the second, fourth and sixth electromagnetic switch valves 111, 113 and 115 are turned on by the electric control unit 62, a hydraulic oil is discharged from the clutch 20 and the brakes 36 and 53 connected to the first, third and fifth electromagnetic switch valves 111, 113 and 115 which are in the "Off" condition. Thus, the clutch 20, the brakes 36 and 53 and the rear clutch 33 are released. On the other hand, the line pressure from the hydraulic pump 103 is supplied to the clutches 34 and 52 through the fourth and sixth electromagnetic switch valves 114 and 116 which are in the "On" condition. When the second electromagnetic switch valve 112 is in the "On" condition, the hydraulic oil is supplied to the 2-5 brake 31, too. Thus, the automatic transmission is shifted to the fifth forward speed by engaging the clutches 34 and 52 and the 2-5 brake 31.

The above described gear change among the first forward speed through the fifth forward speed are determined based on a rotational speed of the output shaft 40 corresponding to a driving speed of a vehicle, and an opening of a throttle so that the gear change is selected from a gear change map as shown in FIG. 3 preset and memorized in the electromagnetic control unit 62 base on the positions of the shift change lever and an On/Off condition of the OD switch.

If the shift change lever is selected to the R-range by a driver, the notch 129 of the manual valve 108 is moved to the R position. Then, hydraulic oil from the oil path 109 is supplied to the rear clutch 33 through the oil path 110 by the manual valve 108. On the other hand, the oil path 117 connected to the electromagnetic switch valves 112 through 114 and 116 is connected to the oil discharge path 121.

Therein, only the first and fifth electromagnetic switch valves 111 and 115 become the "On" condition, hydraulic oil is discharged from the clutches 20, 34 and 52 and the 2-5 brake 31 connected to the second through fourth and sixth electromagnetic switch valves 112 through 114 and 116 which are in the "Off" condition, respectively. Then the clutches 20, 34 and 52 and the 2-5 brake 31 and the rear clutch 33 are released. On the other hand, the line pressure from the hydraulic oil 103 is supplied to the brakes 36 and 53 through the first and fifth electromagnetic switch valves 111 and 115 which are in the "On" condition, respectively. As the result, the automatic transmission is shifted to the rear speed by engaging the brakes 36 and 53 and the rear clutch 33.

In the five forward speed and one reverse speed automatic transmission as described above, when a skip shift from the first through third gear shifts, to the fourth and fifth gear shifts, for example, an up-shift from the third forward speed to the fifth forward speed or a down-shift from the fifth forward speed to the third forward speed, it is necessary to engage and release the clutches 20 and 34 and the brakes 31 and 36 in first gear shift mechanism and engage and release the 4-5 clutch 52 and the rear brake 53 in the second gear shift mechanism, simultaneously.

When a desired gear change is accomplished by operating the first gear change mechanism and the second gear change mechanism simultaneously, a rate of change of a first input shaft rotational speed vFR, which is a rate of change of the first gear change input shaft 16 affected as an input shaft of the first gear change mechanism, and a rate of change of a second input shaft rotational speed vSR, which is a rate of change of the follower gear 44 affected as an input shaft of the second gear change mechanism, are adjusted to a desired rate of change of a first input shaft rotational speed vFO and a desired rate of change of a second input shaft rotational speed vSO. This is achieved by controlling a duty ratio with respect to the respective electromagnetic switch valves 111 through 116 for hydraulic oil discharging from, and supplying to, the clutches 20, 33, 34 and 52 and the brakes 31, 36 and 53, respectively.

In a preferred embodiment of the present invention, two different kinds of controls are operated. One is an engaging and releasing timing control to coincide with an engaging timing of a frictional engaging element of a engaging member to be engaged during the gear change operation and a releasing timing of a frictional engaging element of a released member to be released during the gear change operation. Another is a gear change terminal timing control to coincide with a gear change terminate timing of the first gear change mechanism and a gear change terminate timing of the second gear change mechanism.

Regarding the above mentioned engaging and releasing timing control, it will be explained with reference to the operation of the first gear change mechanism.

Firstly, an engaging period, which starts from the moment of supplying hydraulic oil to the engaging element of the engaging member of the first gear change mechanism and finishes at a moment when an actual engagement is initiated is compared with a releasing period, which starts at a moment of discharging hydraulic oil from the engaging element of the released member of the first gear change mechanism and finishes at a moment when the frictional engaging element of the released member actually starts slipping. If the engaging period is longer than the releasing period, after passing a time corresponding to a time difference between the engaging period and the releasing period, the electromagnetic switch valves corresponding to the frictional engaging elements of the releasing member of the first gear change mechanism are switched to completely release the frictional engaging elements of the releasing member. In a period immediately after passing the engaging period, where the frictional engaging elements are just about to start to transmit torque, an initial duty ratio for starting a gear change is output to electromagnetic switch valves corresponding to the frictional engaging elements of the engaging member. By maintaining hydraulic pressure at a constant level corresponding to the initial duty ratio for starting a gear change, it is possible to coincide the releasing timing and the engaging timing.

On the other hand, if the engaging period is shorter than the releasing period, the electromagnetic switch valves have their electric conductive conditions switched corresponding to the frictional engaging elements of the releasing member of the first gear change mechanism simultaneously with a signal for starting the gear change and immediate actuation of releasing operation of the frictional engaging elements of the releasing member of the first gear box mechanism. In a period after passing a period corresponding to the difference between the engaging period and the releasing period, and before transmitting the torque to the frictional engaging elements of the engaging member actually, a predetermined hydraulic pressure is output, corresponding to the initial duty ratio $D_{FB}$ for starting a gear change of the first gear change mechanism. By maintaining the hydraulic pressure corresponding to the initial duty ratio $D_{FB}$, it is possible to coincide the release timing and the engagement timing.

In such an embodiment, a one-way clutch 54 is equipped at the second gear change mechanism. If the gear is shifted employing the one-way clutch 54, an engagement of the frictional engaging elements of the engaging member and the frictional engaging elements of the releasing member are not switched. Thereby, it is unnecessary to coincide the engaging timing of the frictional engaging elements of the engaging member and the releasing timing of the frictional engaging elements of the releasing member similar to the first gear change mechanism. The electromagnetic valves corresponding to the frictional engaging elements of the releasing member of the second gear change mechanism have their electric conductive conditions changed immediately after outputting a gear change signal and it is finished when the frictional engaging elements of the releasing member are completely released.

The frictional engaging elements of the engaging member are controlled as follows.

Firstly, a total period is calculated which is the sum of the engaging period of the frictional engaging elements of the engaging member of the first gear change mechanism and the period after finishing the engaging period and before actually transmitting the torque to the frictional engaging elements of the engaging member. Then, a total period of the second gear change mechanism is calculated. After passing the difference period between the two total periods, the initial duty ratio for starting a gear change of the second gear change mechanism is output during a period subsequent to finishing the engaging period of the frictional engaging elements of the engaging member of the second gear change mechanism and prior to actually starting transmission of the torque to the frictional engaging elements of the engaging member actually. Thus, a predetermined hydraulic pressure is maintained corresponding to the output initial duty ratio for starting a gear change of the second gear change mechanism.

Although the above described case mentions that the first gear change mechanism starts its gear change before starting the second gear change mechanism, it is set to prevent the frictional engaging elements of the engaging member of the second gear change mechanism from starting its gear change before the first gear change mechanism starting. On the contrary, if the second gear change mechanism starts its gear change earlier, it is controlled to prevent the frictional engaging elements of the engaging member of the first gear change mechanism from starting.

On the other hand, regarding the control when the above mentioned gear changed is accomplished, a predictive period t of finishing the engagement of the frictional engaging elements of the engaging member of the first gear change mechanism is calculated based on the desired rate of change of the first input shaft rotational speed vFO. The desired rate of change of the second input shaft rotational speed vSO of the follower gear 44 is calculated based on the predictive period t.

If an actual input shaft rotational speed and a predictive rotational speed of the first gearbox input shaft 16, shifted to the n-th forward speed calculated from the rotational speed and a gear ratio of the gearbox output shaft 40, are shown as NFR and NFN, respectively, the predictive period t is shown in the following equation (11). If the predictive rotational speed of the follower gear 44 shifted to the n-th forward speed calculated from the rotational speed and a gear ratio of the second gearbox output shaft 40 and the actual rotational speed of the follower gear 44 (hereinafter, it is referred to as "actual second input shaft rotational speed") are shown as NSN and NSR, respectively, the desired rate of change of the second input shaft rotational speed vSO is shown in the following equation (12).

$$t=(N_{PR}-N_{Fn})/(60 \cdot v_{FR}) \quad (11)$$

$$v_{so}=(N_{Sn}-N_{SR})/(60 \cdot t) \quad (12)$$

vFR is the first rate of change of the rotational speed.

The first gear change mechanism control duty ratio DF of the hydraulic pressure with respect to the frictional engaging elements of the engaging member of the first gear change mechanism is corrected by detecting the difference ΔvF between the desired first input shaft rotational speed change rate vFO and the actual first input shaft rotational speed change rate vFR of the first gearbox input shaft 16. On the other hand, the second gear change mechanism control duty ratio D5 of the hydraulic pressure with respect to the frictional engaging elements of the engaging member of the second gear change mechanism is corrected by detecting the difference ΔvS between the desired second input shaft rotational speed change rate vSO and the actual second input shaft rotational speed change rate vSR. Thereby, the gear change terminating timing of the frictional engaging elements of the engaging member of the first gear change mechanism is coincided with the gear change terminating timing of the frictional engaging elements of the engaging member of the second gear change mechanism.

In an embodiment according to the present invention, an up-shift operation from the third forward speed to the fifth forward speed is shown in FIG. 4 through FIG. 7. The following description is explained as a case in which a total period of an actual period tF from actually supplying hydraulic oil to a released 2-5 brake 31 to starting an engagement of the 2-5 brake 31 (hereinafter, it is referred to as "2-5 brake engaging period) and the period tTF from finishing the 2-5 brake engaging period tF to transmitting a driving torque at the third forward speed to the 2-5 brake 31 (hereinafter, it is referred to as "first gear change mechanism torque transmitting terminating period") is shorter than a total period of a period tS from supplying hydraulic oil to a released 4-5 clutch to actually starting an engagement of the 4-5 clutch 52 (hereinafter, it is referred to as "4-5 clutch engaging period") and a period tTS from finishing the 4-5 clutch engaging period tS to transmitting a driving torque to the 4-5 clutch 52 shifted in the third forward speed (hereinafter, it is referred to as "second gear change mechanism torque transmitting terminating period"), that is, the case which the first gear change mechanism is operated earlier.

Figure 4:
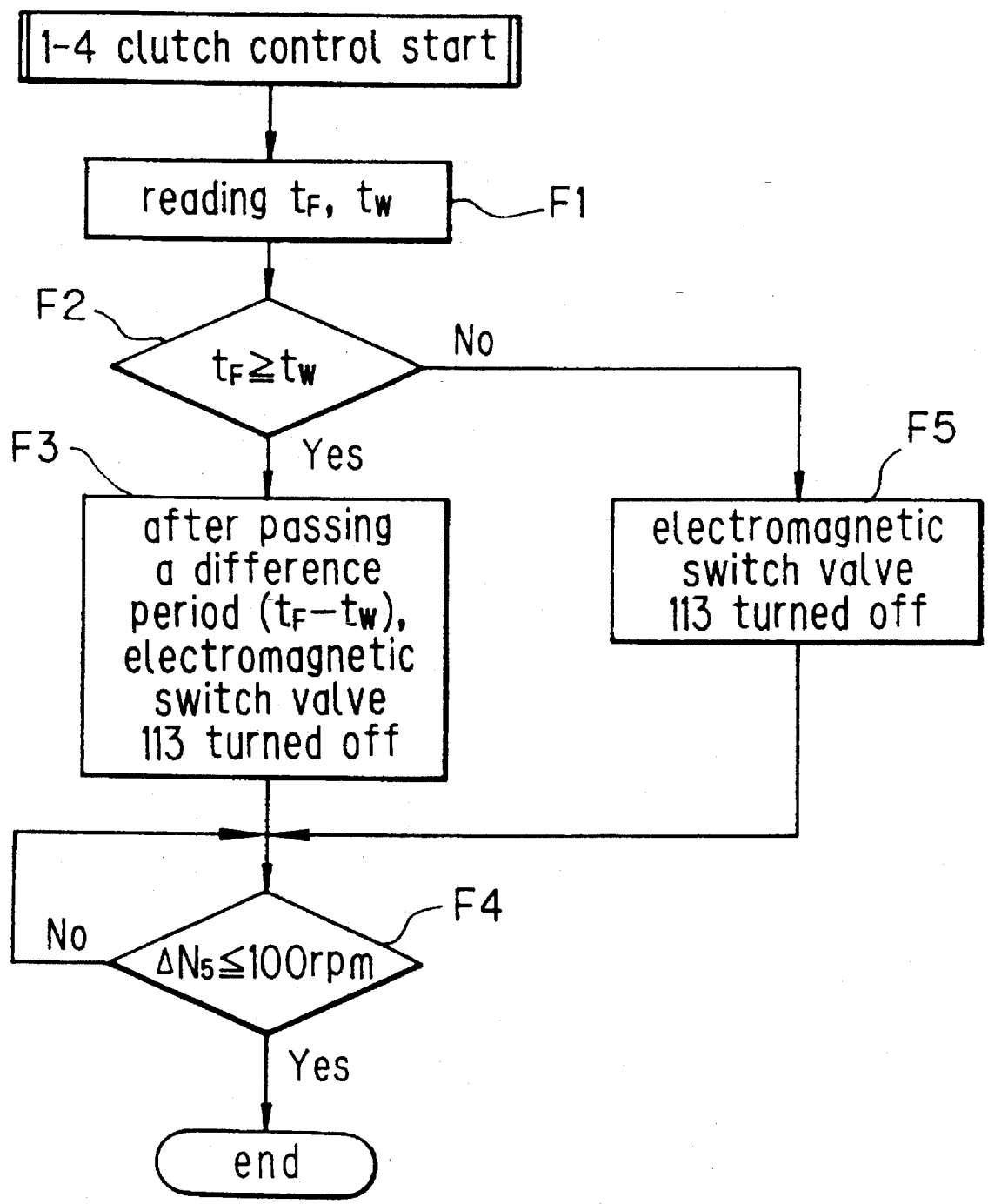
FIG. 4 shows a flow chart for releasing a 1-4 clutch from the third forward speed to the fifth forward speed in an up-shift operation of an embodiment of the present invention as shown in FIG. 5 through FIG. 7.

As shown in FIG. 4, in the first gear change mechanism, the 2-5 brake engaging period tF and a period from discharging hydraulic oil from the engaged 1-4 clutch 20 to the beginning slip (hereinafter, it is referred to as "release waiting period") tW are read at step F1. In the next step, it is judged whether the 2-5 brake engaging period tF is longer than the release waiting period tW in step F2.

In step F2, if it is judged that the 2-5 brake engaging period tF is longer than the release waiting time tW, that is, the 1-4 clutch 20 begins to slip before starting an engagement of the 2-5 brake 31, the third electromagnetic switch valve 113 is turned off after passing a period between the 2-5 brake engaging period tF and the release waiting period tW at step F3. Thereby, the releasing timing of the 1-4 clutch 20 is coincided with the engaging timing of the 2-5 brake 31.

In step F4, a rotational speed NF5 of the first gear change mechanism input shaft 16 shifted to the fifth forward speed calculated from the gear ratio of the fifth forward speed and a detecting signal from the second output shaft rotational sensor 65 (hereinafter, it is referred to as "first input shaft rotational speed at the fifth forward speed) is compared with and an actual rotational speed NFR of the gear change mechanism input shaft 16 detected from the first input shaft rotation sensor 63, and it is judged whether a rotational speed difference ΔN5 is less than 100 rpm. Step F4 is repeated until the rotational speed difference ΔN5 is less than 100 rpm, that is, until it is judged that the gear change at the fifth forward speed is finished.

On the other hand, in step F2, if it is judged that the 2-5 brake engaging period tF is shorter than the release waiting period tW, that is, it is judged that the 1-4 clutch 20 begins to slip after starting an engagement of the 2-5 brake, the third electromagnetic switch valve 113 is immediately turned off at step F5 and then the operation goes to step F4.

Figure 5:
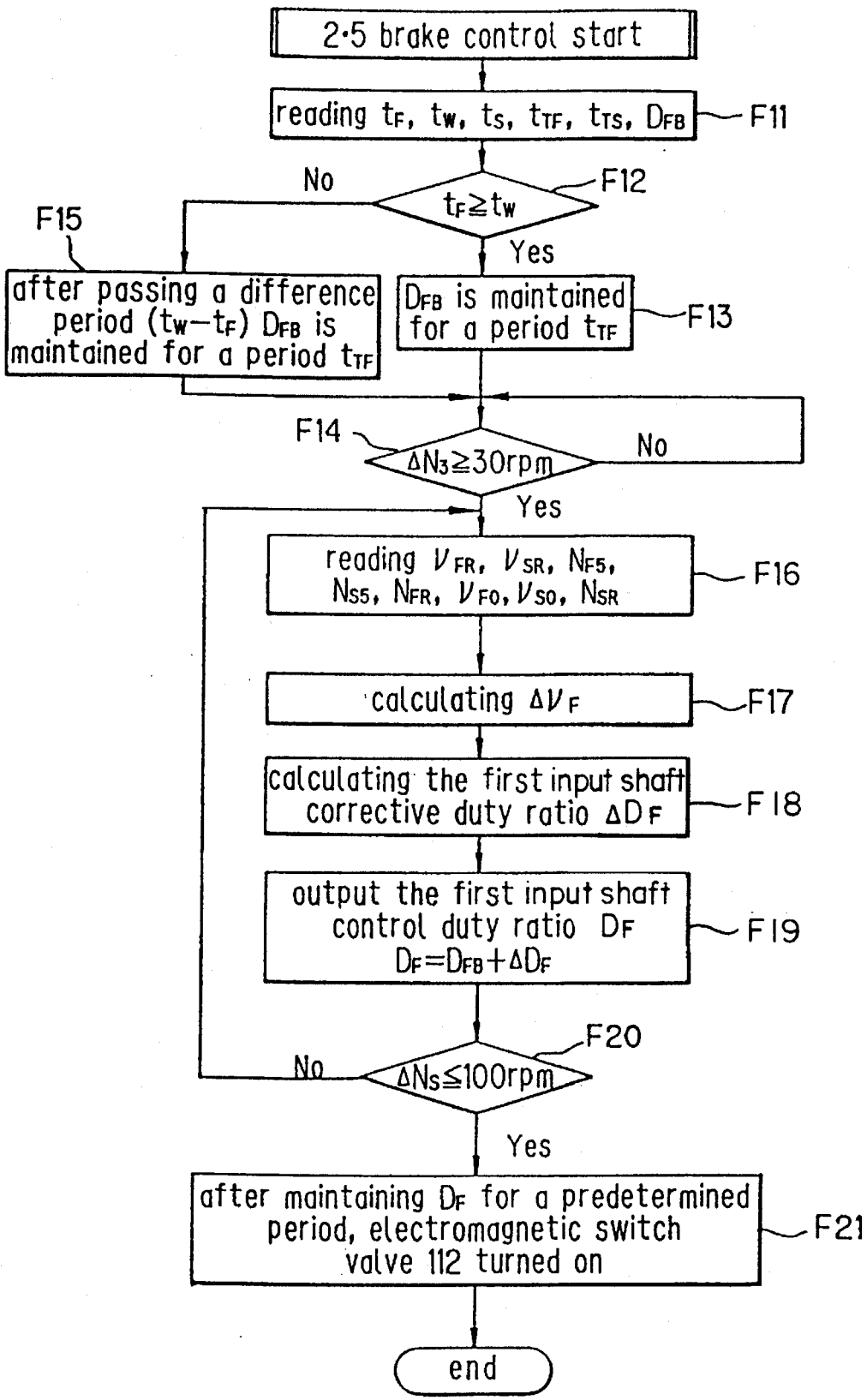
FIG. 5 shows a flow chart for engaging a 2-5 brake from the third forward speed to the fifth forward speed in an up-shift operation of an embodiment of the present invention.

During the operation from step F1 through step F5, the following operation is operated simultaneously. As shown in FIG. 5, it includes the 2-5 brake engaging period tF, the 2-5 brake release waiting period tW, the 4-5 clutch engaging period tS, a first gear change mechanism torque transmitting terminating period tTF after finishing the 2-5 brake engaging time tW and before starting the gear change of the first gear change mechanism, a second gear change mechanism torque terminating period tTS from finishing the 4-5 clutch engaging period tTS before starting the gear change of the second gear change mechanism, the first gear change mechanism gear change start duty ratio DFB, respectively at step F11. In the next step, it is judged whether the 2-5 brake engaging time tF is longer than the release waiting period tW at step F12.

If it is judged that the 2-5 brake engaging time tF is longer than the release waiting period tW, that is, the 1-4 clutch 20 begins to slip before starting the engagement of the 2-5 brake 31 at step F12, the first gear change mechanism gear change start duty ratio DFB is maintained only in the first gear change mechanism torque transmitting terminating period tTF. Thereby, the engaging timing of the 2-5 brake 31 becomes shorter corresponding to the releasing timing of the 1-4 clutch 20.

In step F14, a rotational speed NF3 of the first gear change mechanism input shaft 16 shifted to the third forward speed calculated from the gear ratio at the third forward speed and a detecting signal from the second output shaft rotational sensor 65 (hereinafter, it is referred to as "first input shaft rotational speed at the third forward speed) is compared to and an actual rotational speed NFR of the gear change mechanism input shaft 16 detected from the first input shaft rotation sensor 63, and it is judged whether a rotational speed difference ΔN3 is more than 30 rpm. Step F14 is repeated until the rotational speed difference ΔNs is more than 30 rpm, that is, until it is judged that the gear change from the third forward speed to the fifth forward speed is initiated.

In the step F12, if it is judged that the 2-5 brake engaging time tF is shorter than the release waiting period tW, that is, it is judged that the engaging timing of the 2-5 brake 31 is earlier than the releasing timing of the 1-4 clutch 20, the first gear change mechanism gear change start duty ratio DFB is maintained during the first gear change mechanism torque transmitting period tTF only after passing the difference between the 2-5 brake engaging time tF and the release waiting period tW at step F15. Thereby, the engaging timing of the 2-5 brake 31 is delayed corresponding to the release timing of the 1-4 clutch 20 so that the releasing timing and the engaging timing of the 2-5 brake 31 are coincided. After that, the operation goes to the step F14.

If it is judged that the rotational speed difference ΔN3 is more than 30 rpm, that is, the gear change from the third forward speed to the fifth forward speed is initiated at step F14, the first input shaft rotational speed change rate vFR, the second input shaft rotational speed change rate vSR, the first input shaft rotational speed shifted to the fifth forward speed NF5, a rotational speed NS5 of the follower gear 44 shifted to the fifth forward speed calculated from the gear ratio at the fifth forward speed and a detected signal from the second output shaft rotation sensor 65 (hereinafter, it is referred to as "the second input shaft rotational speed at the fifth forward speed"), the actual first input shaft rotational speed vSO, the desired first input shaft rotational speed change rate vFO, and the desired second input shaft rotational speed change rate NSR are read, respectively at step F16. The difference ΔvF between the first input shaft rotational speed change rate vFR and a predetermined desired input shaft rotational speed change rate vFO is calculated from the following equation.

$$\Delta vF = (vFO + KF.vSO) - (vFR + KF.vSR)$$

Herein, KF is a constant.

According to the equations (5) and (9), the first gear change mechanism corrective duty ratio ΔDF with respect to the first gear change mechanism control duty ratio DF is calculated at step F18. In step F19, the first gear change mechanism control duty ratio DF with respect to the second electromagnetic switch valve 112 is output. In step F20, it is judged whether the rotational speed difference ΔN5 between the first input shaft rotational speed at the fifth forward speed NF5 and the actual first input shaft rotational speed NFR is less than 100 rpm.

In step F20, if it is judged that the rotational speed difference ΔN5 between the first input shaft rotational speed at the fifth forward speed NF5 and the actual first input shaft rotational speed NFR is less than 100 rpm, that is, the gear change at the fifth forward speed is finished, the first gear change mechanism control duty ratio DF calculated in step F19 is maintained for a constant moment, for example, 20 micro-second at step F21. Thereby, after finishing the engagement of the 2-5 brake 31 completely, the second electromagnetic switch valve 112 is turned on 100%.

In step F20, if it is judged that the rotational speed difference NFR between the first input shaft rotational speed NF5 at the fifth forward speed and the actual first input shaft rotational speed NFR is more than 100 rpm, that is, the gear change at the fifth forward speed has not been finished, the operation turns to step F16 to repeat for calculating the first gear change mechanism control duty ratio DF.

Figure 6:
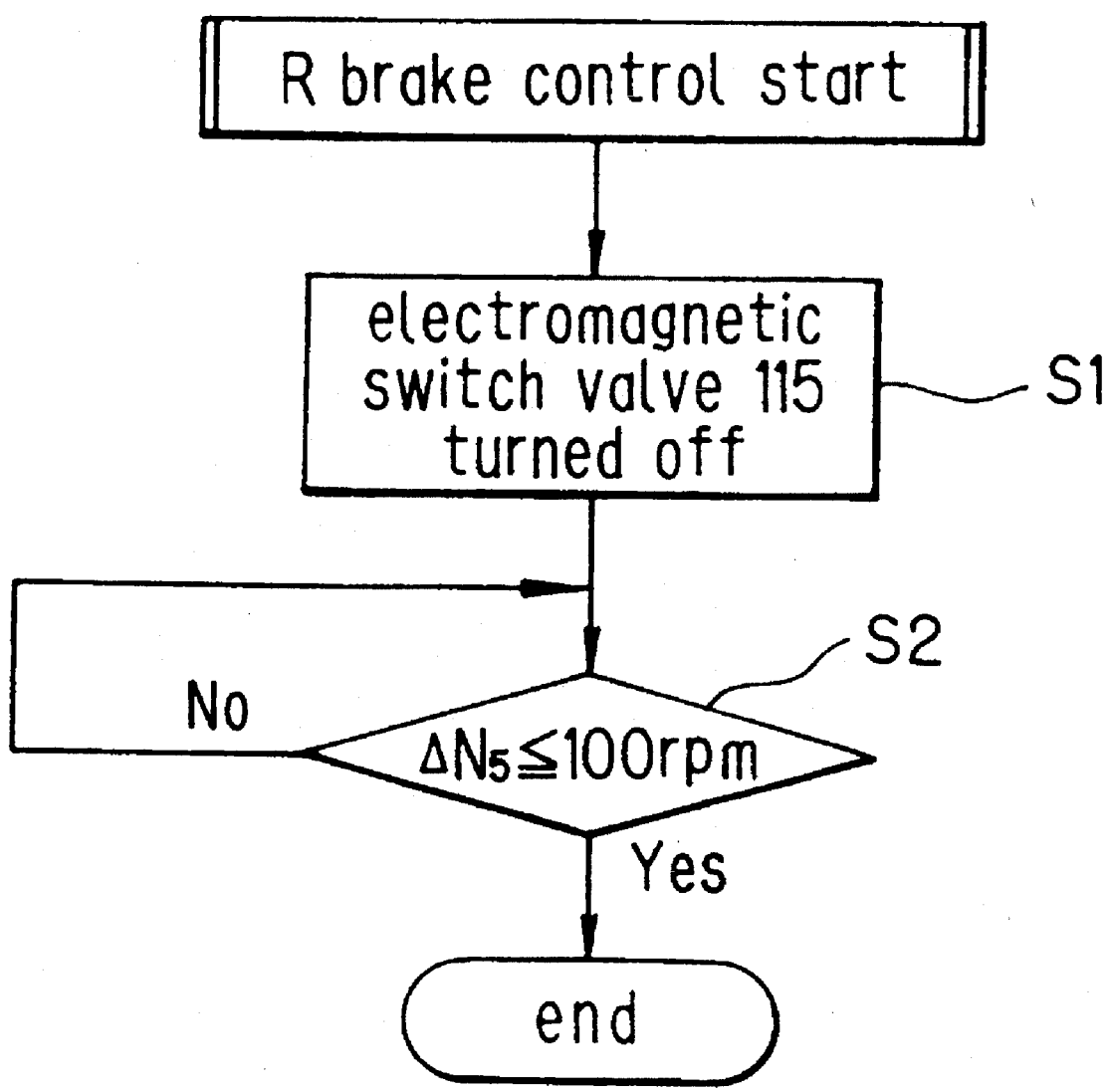
FIG. 6 shows a flow chart for releasing a reverse brake from the third forward speed to the fifth forward speed in an up-shift operation of an embodiment of the present invention.

During the steps F1 through F4 and F11 through F21, the gear change of the second gear change mechanism is operated simultaneously. That is, at the first gear change mechanism, as shown in FIG. 6, the fifth electromagnetic switch valve 115 is turned off at step S1. In step S2, it is compared with the first input shaft rotational speed at the fifth forward speed NF5 calculated from a detected signal from the second output shaft rotation sensor 65 and the gear ratio of the fifth forward speed and the actual input shaft rotational speed detected from the first input shaft rotation sensor 63 and it is judged whether the rotational speed difference ΔN5 is less than 100 rpm. Step S2 is continuously repeated until the rotational speed difference ΔN5 is less than 100 rpm.

Figure 7:
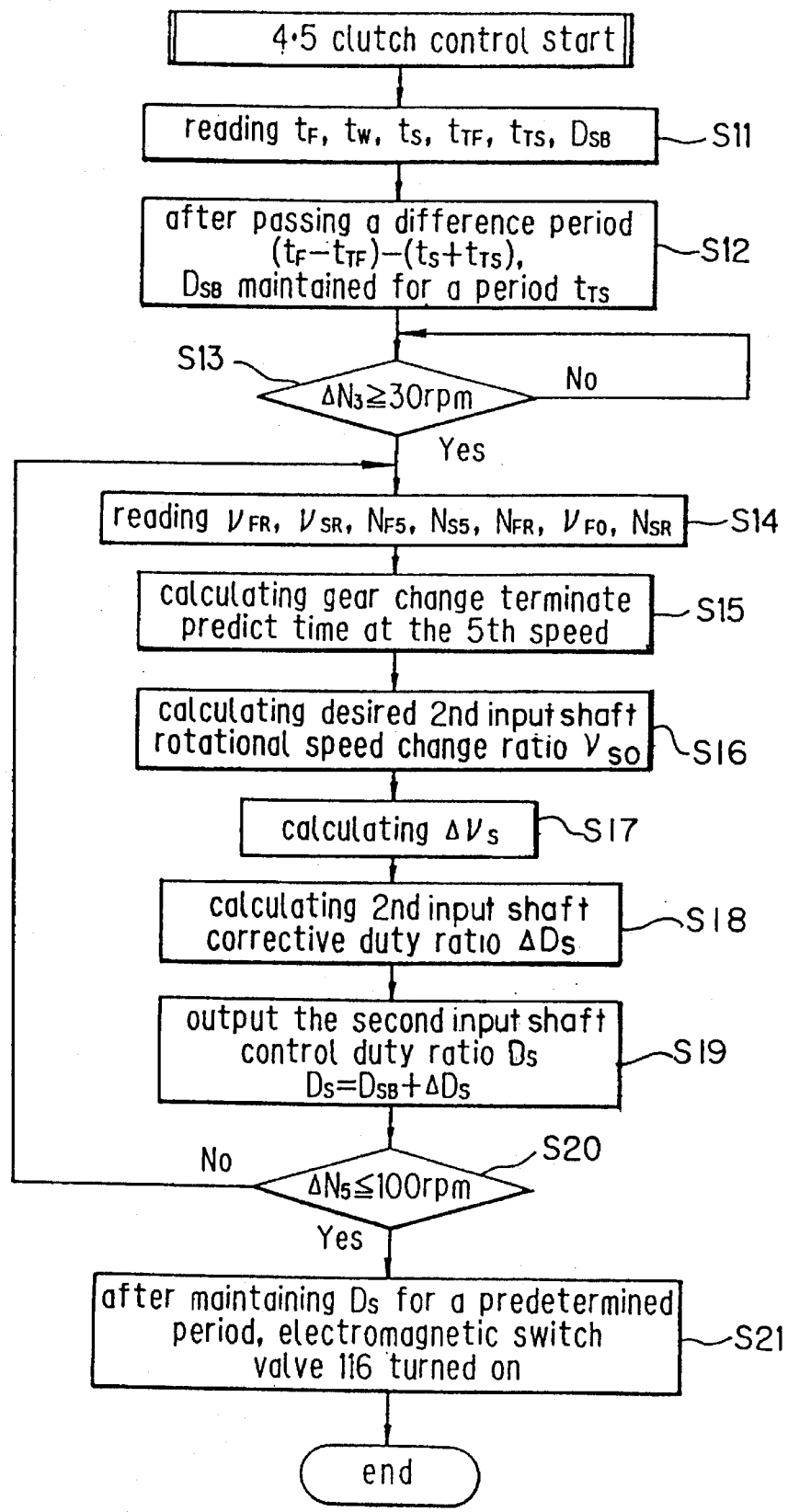
FIG. 7 shows a flow chart engaging a 4-5 clutch from the third forward speed to the fifth forward speed in an up-shift operation of an embodiment of the present invention.

During steps S1 and S2, the following step is operated simultaneously. That is, as shown in FIG. 7, the 2-5 brake engaging period tF, the release waiting period tW, the 4-5 clutch engaging period tS, the first gear change mechanism torque transmitting terminating period tTF, the second gear box mechanism torque terminating period tTS, the second gear change mechanism start duty ratio DSB with respect to the 4-5 clutch 52 is read, respectively.

In step S12, after passing a period for subtracting the total period of the 4-5 clutch engaging time tS and the second gear change mechanism torque transmitting terminating period tTS from the total period of the 2-5 brake engaging period tF and the first gear change mechanism torque transmitting terminating period tTF, the second gear change mechanism gear change start duty ratio DSB is only maintained in the second gear change mechanism torque transmitting terminating period tTS. Thereby, the engaging timing of the 4-5 clutch 52 is delayed in accordance with the engaging timing of the 2-5 brake 31.

In step S13, it is judged whether the rotational speed difference ΔN3, subtracting the actual first input shaft rotational speed NFR from the first input shaft rotational speed at the third forward speed NF3, is more than 30 rpm. Step S13 is continuously repeated until the rotational speed difference ΔN3 is more than 30 rpm.

After the rotational speed difference ΔN3 is more than 30 rpm, that is, the gear change from the third forward speed to the fifth forward speed begins to be operated at step S13, the first input shaft rotational speed change rate vFR, the second input shaft rotational speed change rate vSR, the first input shaft rotational speed at the fifth forward speed NFR, the actual first input shaft rotational speed change rate vFO and the actual second input shaft rotational speed NSR are read, respectively at step S14. In step S15, a predictive gear change terminating period at the fifth forward speed t5 is calculated based on the above equation (11) after finishing the gear change of the fifth forward speed at the first gear change mechanism.

$$t5 = (NFR - NF5)/(60.vFR)$$

In step S16, the desired second input shaft rotational speed change rate vSO is calculated based on the above equation (12).

$$vSO = (NS5 - NSR)/(60.t5)$$

In step S17, a difference ΔvS between the second input shaft rotational speed change rate vSR and the predetermined second input shaft rotational speed change rate vSO is calculated from the following equation.

$$\Delta vS = (vSO + Ks.vFO) - (vSR + Ks.vFR)$$

Herein, KS is a constant.

In step S18, in accordance with the relation between the equations (6) and (10), the second gear change mechanism corrective duty ratio ΔDS with respect to the second gear change mechanism control duty ratio Ds is calculated. In step S19, the second gear change mechanism control duty ratio Ds is output.

In step S20, it is judged whether the rotational speed difference ΔN5 between the first input shaft rotational speed NF5 at the fifth forward speed and the actual first input shaft rotational speed NFR is less than 100 rpm.

In the step S20, it is judged that the rotational speed difference ΔN5 is less than 100 rpm, that is the gear change of the fifth forward speed has been finished, the second gear change mechanism control duty ratio Ds calculated in step S19 is maintained at a predetermined period, for example, 20 micro-second at step S21 in order to engage the 4-5 clutch 52 certainly. After that, the sixth electromagnetic switch valve 116 is turned on 100%.

In step S20, if it is judged that the rotation speed difference ΔN5 between the first input shaft rotational speed NF5 at the fifth forward speed and the actual first input shaft rotational speed NFR is more than 100 rpm, that is, the gear change of the fifth forward speed has not been finished, the operation turns to step S14 to be repeated for calculating the second gear change mechanism control duty ratio DS.

In this embodiment according to the present invention, the case is described in which the total period of the 2-5 brake engaging period tF and the first gear change mechanism torque transmitting terminating period tTF is shorter than the total period of the 4-5 clutch engaging period tS and the second gear change mechanism torque transmitting terminating period tTS. However, in the opposite case, that is, if the second gear change mechanism is operated earlier, the fifth forward speed gear change terminating period of the second gear change mechanism is calculated in order to detect the desired first input shaft rotational speed change rate vFO and the engaging timing of the 2-5 brake 31 of the first gear change mechanism is controlled based on the engaging timing of the 4-5 clutch 52 of the second gear change mechanism.

Figure 8:
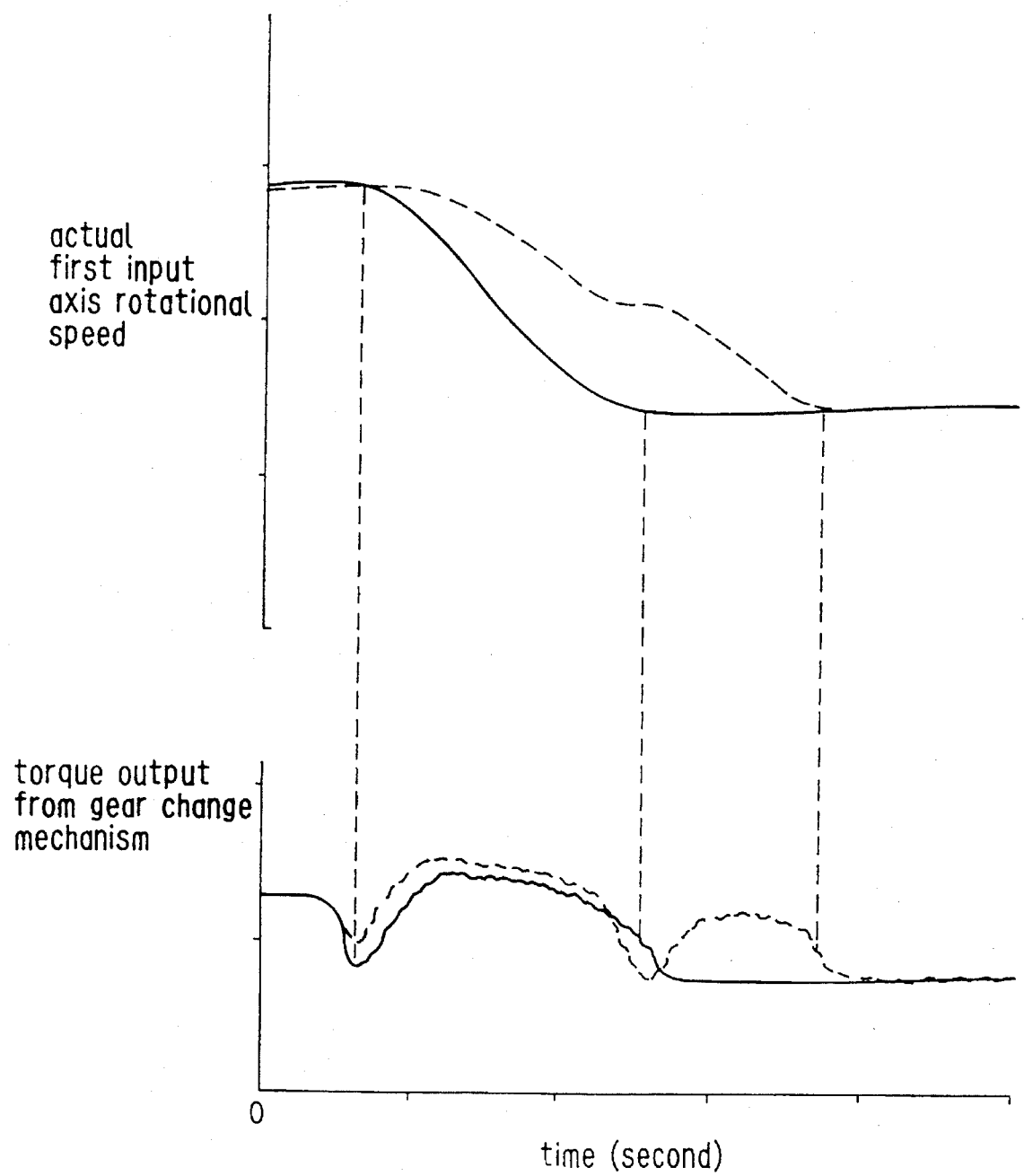
FIG. 8 is a graph showing a relationship between a real first input shaft rotational speed and a gearbox output shaft torque when it is shifted from the first forward speed to the fifth forward speed in an up-shift operation.

In an up-shift operation from the third forward speed to the fifth forward speed in an embodiment according to the present invention, a relationship between the actual first input shaft rotational speed NFR and the gear change mechanism output shaft torque is shown in FIG. 8. In FIG. 8, a real smooth line shows a torque change of the output shaft according to an embodiment of the present invention. On the other hand, the dotted line shows a large torque displacement during a gear shift according to the prior art. Because, the gear shift of the fourth forward speed is operated. The displacement means a shift shock and a drive feeling become worse. Such a difference is shown in an up-shift operation, for example, from the first forward speed to the fourth forward speed, the second forward speed to the fourth forward speed and the second forward speed to the fifth forward speed, and a down-shift operation, for example, the fifth forward speed to the third forward speed, the fifth forward speed to the second forward speed, the fifth forward speed to the first forward speed, the fourth forward speed to the second forward speed and the fourth forward speed to the first forward speed.

In the description of the embodiments of the present invention, although an automatic transmission of five forward speed for a vehicle has been described, the control method according to the present invention can be applied to any automatic transmission of a vehicle, such as a four forward speed transmission for a vehicle.

The invention being thus described, it will be obvious that the same may be varied in many ways, such variations are not to be regarded as a departure from the spirit and scope of the invention, and all such modifications as would be obvious to one skilled in the art are intended to be included within the scope of the following claims.

What is claimed is:

1. A shift control apparatus of an automatic transmission for a vehicle comprising:

a fluid coupling connected to a driving mechanism, a first gear change mechanism, including an input shaft connected to an output shaft of said fluid coupling;

a second gear change mechanism, including an input shaft connected to an output shaft of said first gear change mechanism and an output shaft connected to a wheel member of a vehicle;

first hydraulic control means for controlling an actual rate of change of rotation speed of said input shaft and said output shaft of said first gear change mechanism by selectively controlling flow of hydraulic oil supplied to, and discharged from, said first gear change mechanism;

second hydraulic control means for controlling an actual rate of change of rotation speed of said input shaft and said output shaft of said second gear change mechanism by selectively controlling flow of hydraulic oil supplied to, and discharged from, said second gear change mechanism; and correcting means, connected to the first and second hydraulic control means, for controlling the first and second control means to vary the actual rate of change of rotation speed of the input and output shafts of each of the first and second gear change mechanisms, respectively, to coincide with a predetermined rate of change of rotation speed.

2. The shift control apparatus of claim 1, wherein said correcting means further comprises:

gear change control means for outputting a control signal to control the first and second hydraulic means;

actual first input shaft rotational speed change rate calculating means for calculating the actual rate of change of rotation speed of said input and output shafts of said first gear change mechanism;

desired first input shaft rotational speed change rate calculating means for calculating the predetermined rate of change of rotation speed of said input shaft of said first gear change mechanism;

actual second input shaft rotational speed change rate calculating means for calculating the actual rate of change of rotation speed of said input and output shafts of said second gear change mechanism;

desired second input shaft rotational speed change rate calculating means for calculating the predetermined rate of change of rotation speed of said input and output shafts of said second gear change mechanism;

first corrective means for correcting said control signal provided to said first hydraulic control means to coincide said actual rate of change of rotation speed of said input and output shafts of said first gear change mechanism with said predetermined rate of change of rotation speed of said input and output shafts of said first gear change mechanism; and second corrective means for correcting said control signal provided to said second hydraulic control means to coincide said actual rate of change of rotation speed of said input and output shafts of said second gear change mechanism with said predetermined rate of change of rotation speed of said input and output shafts of said second gear change mechanism.

3. The shift control apparatus of claim 2, wherein said gear change control means comprises:

first input shaft rotational speed change rate difference calculating means for calculating a difference between said predetermined rate of change of rotation speed of said input and output shafts of said first gear change mechanism and said actual rate of change of rotation speed of said input and output shafts of said first gear change mechanism;

second input shaft rotational speed change rate difference calculating means for calculating a difference between said predetermined rate of change of rotation speed of said input and output shafts of said second gear change mechanism and said actual rate of change of rotation speed of said input and output shafts of said second gear change mechanism;

adding means for adding a difference amount calculated from said first input shaft rotational speed change rate difference calculating means and a difference amount calculated from said second input shaft rotational speed change rate difference calculating means; and corrective amount determining means for determining a corrective difference amount calculated by at least one of said first corrective means and said second corrective means based on the added amount calculated by said adding means.

4. The shift control of claim 2, wherein said gear change control means comprises:

actual first input axis rotational speed detecting means for detecting an actual rotational speed of said input axis of said first gear change mechanism, first input axis rotational speed predicting means for predicting a rotational speed of said input axis of said first gear change mechanism after occurrence of a gear change operation;

first gear change terminate judging means for judging termination of a gear change of said first gear change mechanism as said difference between an actual rotational speed of said input axis of said first gear change mechanism and said predictive rotational speed of said input axis of said first gear change mechanism;

actual second input axis rotational speed detecting means for detecting an actual rotational speed of said input axis of said second gear change mechanism;

second input axis rotational speed predicting means for predicting a rotational speed of said input axis of said second gear change mechanism after occurrence of a gear change operation;

second gear change terminate judging means for judging termination of a gear change of said second gear change mechanism as said difference between an actual rotational speed of said input axis of said second gear change mechanism and said predictive rotational speed of said input axis of said second gear change mechanism; and gear change terminate timing coinciding means for coinciding a judged amount of said first gear change terminate timing judging means and a judged amount of said second gear change terminate timing judging means.

5. The shift control apparatus of claim 4, wherein said gear change terminate timing coinciding means comprises:

first gear change period predicting means for predicting a time period for changing gears of said first gear change mechanism; and desired second input shaft rotational speed change rate determining means for determining a predetermined rate of change of rotation speed of said input shaft of said second gear change mechanism based on said predicted time amount predicted by said first gear change period predicting means.

6. The shift control apparatus of claim 5, wherein a time period for changing gears of said first gear change mechanism predicted by said first gear change period predicting means is calculated in accordance with said predetermined rate of change of rotation speed of said input shaft of said first gear change mechanism.

7. The shift control apparatus of claim 4, wherein said gear change terminate timing coinciding means comprises:

second gear change period predicting means for predicting a time period for changing gears of said second gear change mechanism; and desired second input shaft rotational speed change rate determining means for determining a predetermined rate of change of rotation speed of said input shaft of said second gear change mechanism based on said predicted time period predicted by said second gear change period predicting means.

8. The shift control apparatus of claim 7, wherein a time period for changing gears of said second gear change mechanism predicted by said second gear change period predicting means is calculated in accordance with said predetermined rate of change of rotation speed of said input shaft of said second gear change mechanism.

9. The shift control apparatus of claim 1, wherein said gear change control means comprises; an engagement and release timing coinciding means for coinciding an engaging timing and a release timing, and wherein said engaging timing is specified at a time when said frictional engaging elements of at least one of said first gear change mechanism and said second gear change mechanism are engaged in a gear change operation and when said frictional engaging elements actually transmit a torque force, and said release timing is specified as a time when frictional engaging elements of at least one of said first gear change mechanism and said second gear change mechanism are released in a gear change operation and when said frictional engaging elements begin to slip.

10. The shift control apparatus of claim 9, wherein said engagement and release timing coinciding means comprises:

first calculating means for calculating a time period when a last stroke of a piston is finished while said hydraulic oil is supplied to said frictional engaging elements of said engaging member;

second calculating means for calculating a time period when a slip of frictional engaging elements has begun while said hydraulic oil is discharged from said frictional engaging elements of said engaging member;

third calculating means for calculating a time period after completing said last stroke of said piston before actually transmitting said torque force to said engaging elements of said engaging member;

subtract means for calculating a difference time period between a calculated time period calculated by said first calculating means and a calculated time period calculated by said second calculating means;

release signal setting means for setting a release signal for releasing said frictional engaging elements of said released member after passing a time period corresponding to said difference time period calculated by said subtract means when said calculated time period calculated by said first calculating means is longer than said calculated time period calculated by said second calculating means; and engage initial signal setting means for setting an engage initial signal for applying a hydraulic oil at a predetermined level to said frictional engaging elements of said engaging member in said time period calculated by said third calculating means.

11. The shift control apparatus of claim 8, wherein said engagement and release timing coincide means comprises:

first calculating means for calculating a time period when a last stroke of a piston is finished while said hydraulic oil is supplied to said frictional engaging elements of said engaging member;

second calculating means for calculating a time period when a slip of frictional engaging elements has begun while said hydraulic oil is discharged from said frictional engaging elements of said engaging member;

a third calculating means for calculating a time period after completing said last stroke of said piston before actually transmitting said torque force to said engaging elements of said engaging member;

subtract means for calculating a difference time period between a calculated time period calculated by said first calculating means and a calculated time period calculated by said second calculating means; and release signal setting means for setting a release signal for releasing said frictional engaging elements of said released member after passing a time period corresponding to said difference time period calculated by said subtract means when said calculated time period calculated by said first calculating means is longer than said calculated time period calculated by said second calculating means and engage initial signal setting means for setting an engage initial signal for applying a hydraulic oil at a predetermined level to said frictional engaging elements of said engaging member subsequent to said difference time period calculated by said subtract means.

12. The shift control means of claim 2, wherein each said first gear change mechanism and said second gear change mechanism include said frictional engaging elements of an engaging member, and said gear change control means comprises, first calculating means for calculating a time period when a last stroke of a piston is completely finished completely while hydraulic oil is supplied to said frictional engaging elements of said engaging member of said first gear change mechanism, second calculating means for calculating a time period when said frictional engaging elements of said engaging member of said first gear change mechanism actually transmits a torque force after finishing said last stroke of said piston, third calculating means for calculating a time period when a last stroke of a piston is completely finished while hydraulic oil is supplied to said frictional engaging elements of said engaging member of said second gear change mechanism, fourth calculating means for calculating a time period when said frictional engaging elements of said engaging member of said second gear change mechanism actually transmits a torque force after finishing said last stroke of said piston, first adding means for adding time periods calculated by said first calculating means and said second calculating means, second adding means for adding time periods calculated by said third calculating means and said fourth calculating means, and gear change judging means for juding that one of the first and second gear change mechanisms, of which the added time period is shorter than the other of the first and second gear change mechanisms, starts gear change earlier than the other of the first and second gear change mechanisms, by comparing said added time period calculated by said second adding means.

13. The shift control apparatus of claim 2, wherein one of said first gear change mechanism and said second gear change mechanism includes a one way clutch mechanism for transmitting a driving force along one direction and said gear change control means comprises:

first calculating means for calculating a time period when a lost stroke of a piston is completely finished while hydraulic oil is supplied to frictional engaging elements of an engaging member of the one of the first and second gear change mechanisms with said one way clutch mechanism;

second calculating means for calculating a time period when said frictional engaging elements of said engaging member of said gear change mechanism with said one way clutch mechanism actually transmits a torque after finishing said last stroke of said piston, third calculating means for calculating a time period when a last stroke of a piston is completely finished while hydraulic oil is supplied to frictional engaging elements of an engaging member of the other of the first and second gear change mechanisms;

fourth calculating means for calculating a time period when said frictional engaging elements of said engaging member of said other of the first and second gear change mechanisms actually transmits a torque after finishing said last stroke of said piston;

first adding means for adding time periods calculated by said first calculating means and said second calculating means;

second adding means for adding time periods calculated by said third calculating means and said fourth calculating means, and gear change judging means for juding that one of the first and second gear change mechanisms, of which the added time period is shorter than the other of the first and second gear change mechanism, starts gear change earlier than the other of the first and second gear change mechanisms, by comparing said added time period calculated by said first adding means and said added time period calculated by said second adding means.

14. A shift control method of an automatic transmission for a vehicle including a shift control device of the automatic transmission which comprises, a fluid coupling connected to a driving mechanism, a first gear change mechanism, including an input shaft connected to an output shaft of said fluid coupling, a second gear change mechanism, including an input shaft connected to an output shaft of the first gear change mechanism and an output shaft is connected to a wheel member of a vehicle, first hydraulic control means for controlling a ratio of rotation of the input shaft and the output shaft of the first gear change mechanism by selectively controlling flow of hydraulic oil supplied to, and discharged from, a plurality of frictional engaging elements provided at the first gear change mechanism, second hydraulic control means for controlling a ratio of rotation of the input shaft and the output shaft of the second gear change mechanism by selectively controlling flow of hydraulic oil supplied to and discharged from, a plurality of frictional engaging elements provided at the second gear change mechanism, and gear change control means for outputting control signals to the first hydraulic control means and the second hydraulic control means, said shift control method comprising the steps of:

calculating an actual rate of change of rotational speed of said input shaft and the output shaft of the first gear change mechanism, calculating a predetermined rate of change of rotational speed of the input shaft and the output shaft of the first gear change mechanism, calculating an actual rate of change of rotational speed of the input shaft and the output shaft of the second gear change mechanism, calculating a predetermined rate of change of rotational speed of the input shaft and the output shaft of the second gear change mechanism, correcting the control signal provided to said first hydraulic control means to coincide the actual rate of change of rotational speed of the input shaft and the output shaft of the first gear change mechanism with the predetermined rate of change of rotational speed of the input shaft and the output shaft of the first gear change mechanism, and correcting the control signal provided to the second hydraulic control means to coincide the actual rate of change of rotational speed of the input shaft and the output shaft of the second gear change mechanism with the predetermined rate of change of rotational speed of the input shaft and the output shaft of the second gear change mechanism.

15. The shift control method of claim 14, wherein the gear change control means comprises, first input shaft rotational speed change rate difference calculating means for calculating a difference between the predetermined rate of change of rotational speed of the input shaft and the output shaft of the first gear change mechanism and the actual rate of change of rotational speed of the input and output shafts of the first gear change mechanism, second input shaft rotational speed change rate difference calculating means for calculating a difference between said predetermined rate of change of rotational speed of the input and output shafts of the second gear change mechanism and the actual rate of change of rotational speed of the input and output shafts of the second gear change mechanism, adding means for adding a difference amount calculated from the first input shaft rotational speed change rate difference calculating means and a difference amount calculated from the second input shaft rotational speed change rate difference calculating means, and corrective amount determining means for determining a corrective difference amount calculated by at least one of the first corrective means and the second corrective means based on the added amount calculated by the added means.

16. The shift control method of claim 14, further comprising the steps of:

detecting an actual rotational speed of the input axis of the first gear change mechanism;

predicting a rotational speed of occurrence of the input axis of the first gear change mechanism after occurrence of a gear change operation;

judging termination of a gear change of the first gear change mechanism as the difference between an actual rotational speed of the input axis of the first gear change mechanism and the predictive rotational speed of the input axis of said first gear change mechanism;

detecting an actual rotational speed of the input axis of the second gear change mechanism;

predicting a rotational speed of the input axis of the second gear change mechanism after occurrence of a gear change operation;

judging termination of a gear change of the second gear change mechanism as the difference between an actual rotational speed of the input axis of the second gear change mechanism and the predictive rotational speed of the input axis of the second gear change mechanism, and coinciding a judged amount of the first gear change mechanism and a judged amount of the second gear change mechanism.

17. The shift control method of claim 16, wherein the step for coinciding gear change timing comprises the substeps of:

predicting a time period for changing gears of the first gear change mechanism, and determining a predetermined rate of change of rotational speed of the input and the output shafts of the second gear change mechanism based on the predicted time period.

18. The shift control method of claim 17, wherein a time period for changing gears of the first gear change mechanism is predicted in accordance with the predetermined rate of change of rotational speed of the input shaft and the output shaft of the first gear change mechanism.

19. The shift control method of claim 15, wherein said step for coinciding gear change timing comprises the substeps of:

predicting a time period for changing gears of the second gear change mechanism, and determining a predetermined rate of change of rotational speed of the input shaft and output shaft of the second gear change mechanism based on the predicted time period predicted by the second gear change mechanism.

20. The shift control method of claim 19, wherein a time period for changing gears of the second gear change mechanism predicted by the second gear change mechanism is calculated in accordance with the predetermined rate of change of rotational speed of the input and the output shafts of the second gear change mechanism.

21. The shift control method of claim 14, further comprising the steps:

coinciding an engaging timing and a release timing, wherein said engaging timing is specified at a time when the frictional engaging elements of at lest one of the first gear change mechanism and the second gear change mechanism are engaged in a gear change operation and when the frictional engaging elements actually transmits a torque force, and the release timing is specified as a time when the frictional engaging elements of at least one of the first gear change mechanism and the second gear change mechanism are released in a gear change operation and when the frictional engaging elements begin to slip.

22. The shift control method of claim 21 further comprising the steps of:

calculating a time period when a last stroke of a piston is finished while the hydraulic oil is supplied to the frictional engaging elements of the engaging member;

calculating a time period when a slip of frictional engaging elements has begun while the hydraulic oil is discharged from the frictional engaging elements of the engaging member;

calculating a time period after completing the last stroke of the piston before actually transmitting the torque force to the engaging elements of the engaging member;

calculating a difference time period between a calculated time period calculated in the first calculating step and a calculated time period calculated in the second calculating step, setting a release signal for releasing the frictional engaging elements of the released member after passing a time period corresponding to the difference time period calculated when the calculated time period calculated in the first calculating step is longer the the calculated time period calculated in the second calculating step; and setting an engage initial signal for applying hydraulic oil at a predetermined level to the frictional engaging elements of the engaging member in the time period calculated in the third calculating step.

23. The shift control method of claim 21 comprising the steps of:

calculating a time period when a last stroke of a piston is finished while the hydraulic oil is supplied to the frictional engaging elements of the engaging member;

calculating a time period when a slip of frictional engaging elements has begun while the hydraulic oil is discharged from the frictional engaging elements of the engaging member;

calculating a time period after completing the last stroke of the piston before actually transmitting the torque force to the engaging elements of the engaging member;

calculating a difference time period between a calculated time period calculated in the first calculating step and a calculated time period calculated in the second calculating step; and setting a release signal for releasing the frictional engaging elements of the released member after passing a time period corresponding to the difference time period calculated in the subtract step when the calculated time period calculated in the first calculating step is longer than the calculated time period calculated in the second calculating step; and setting an engage initial signal for applying a hydraulic oil at a predetermined level to the frictional engaging elements of the engaging member subsequent to passing the difference time period calculated in the subtract step.

24. The shift control method of claim 14, further comprising the steps of:

calculating a time period when a last stroke of a piston is finished completely finished while hydraulic oil is supplied to the frictional engaging elements of the engaging member of the first gear change mechanism;

calculating a time period when the frictional engaging elements of the engaging member of the first gear change mechanism actually transmits a torque force after finishing the last stroke of the piston;

calculating a time period when a last stroke of a piston is completely finished while hydraulic oil is supplied to the frictional engaging elements of the engaging member of the second gear change mechanism;

calculating a time period when the frictional engaging elements of the engaging member of the second gear change mechanism actually transmits a torque force after finishing the last stroke of the piston;

adding time periods calculated in the first calculating step and the second calculating step;

adding time periods calculated in the third calculating step and the fourth calculating step; and juding that one of the first and second gear change mechanisms, of which added time period is shorter than the other of the first and second gear change mechanisms, starts gear change earlier than the other of the first and second gear change mechanisms by comparing the added time period calculated in the first adding step and the added time period calculated in the second adding step.

25. The shift control method of claim 14, wherein one of the first gear change mechanism and the second gear change mechanism includes a one way clutch mechanism for transmitting a driving force along one direction and said shift control method further comprises the steps of:

calculating a time period when a last stroke of a piston is completely finished while hydraulic oil is supplied to the frictional engaging elements of the engaging member of the one of the first and second gear change mechanisms with the one way clutch mechanism;

calculating a time period when the frictional engaging elements of the engaging member of the gear change mechanism with the one way clutch mechanism actually transmits a torque actually after finishing the last stroke of the piston;

calculating a time period when a last stroke of a piston is completely finished while hydraulic oil is supplied to the frictional engaging elements of the engaging member of the other of the first and second gear change mechanisms, calculating a time period when the frictional engaging elements of the engaging member of the other of the first and second gear change mechanisms actually transmits a torque force after finishing the last stroke of the piston;

adding time periods calculated in the first calculating step and the second calculating step;

adding time periods calculated in the third calculating step and the fourth calculating step; and juding that one of the first and second gear change mechanisms, of which the added time period is shorter than the other of the first and second gear change mechanisms, starts gear change earlier than the other of the first and second gear change mechanisms, by comparing the added time period calculated in the first adding step and the added time period calculated in the second adding step.

* * * * *